US012713170B2

(12) United States Patent
Lee et al.

(10) Patent No.: US 12,713,170 B2
(45) Date of Patent: Aug. 18, 2026

(54) METHOD FOR SENSING WEARING OF ELECTRONIC DEVICE, AND ELECTRONIC DEVICE

(71) Applicant: Samsung Electronics Co., Ltd., Suwon-si (KR)

(72) Inventors: Yunguk Lee, Suwon-si (KR); Youngjin Oh, Suwon-si (KR); Younhyung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 18/659,535

(22) Filed: May 9, 2024

(65) Prior Publication Data

US 2024/0314480 A1 Sep. 19, 2024

Related U.S. Application Data

(63) Continuation of application No. PCT/KR2022/016746, filed on Oct. 28, 2022.

(30) Foreign Application Priority Data

Dec. 20, 2021 (KR) ........................ 10-2021-0182944
Mar. 4, 2022 (KR) ........................ 10-2022-0027970

(51) Int. Cl.
*H04R 1/10* (2026.01)

(52) U.S. Cl.
CPC ....... *H04R 1/1016* (2013.01); *H04R 2420/07* (2013.01)

(58) Field of Classification Search
CPC .......................... H04R 1/1016; H04R 2420/07
See application file for complete search history.

(56) References Cited

U.S. PATENT DOCUMENTS 10,117,012 B2 * 10/2018 Saulsbury ............ A61B 5/6803
10,313,776 B2 6/2019 Han et al.
(Continued)

FOREIGN PATENT DOCUMENTS

CN 113709617 A 11/2021
CN 113316076 B 3/2023
(Continued)

OTHER PUBLICATIONS

Extended European Search Report dated Feb. 14, 2025 issued in European Patent Application No. 22911582.9.
(Continued)

*Primary Examiner* — Paul W Huber
(74) *Attorney, Agent, or Firm* — Nixon & Vanderhye P.C.

(57) ABSTRACT

An electronic device according to various embodiments may comprise: a grip sensor, a touch sensor, a wearing detection sensor, and at least one processor, comprising processing circuitry, operatively connected to the grip sensor, the touch sensor, and the wearing detection sensor. At least one processor, individually and/or collectively, may be configured to: check a wearing process for the electronic device using the grip sensor and the wearing detection sensor, respond to the checked wearing process to stop a touch sensing function for the touch sensor, measure at least one sensing value related to the wearing process using the grip sensor and the wearing detection sensor, check completion of the wearing process based on the at least one measured sensing value, and resume the stopped touch sensing function in response to the completion of the checked wearing process.

20 Claims, 17 Drawing Sheets

(56) References Cited

U.S. PATENT DOCUMENTS

| | | | | |
|---|---|---|---|---|
| 10,771,884 | B2 * | 9/2020 | Mutlu | H04R 1/1041 |
| 10,824,192 | B2 | 11/2020 | Guo | |
| 10,959,010 | B1 | 3/2021 | Wang | |
| 11,496,834 | B2 * | 11/2022 | Carrigan | H04R 1/1041 |
| 2015/0201283 | A1 | 7/2015 | Jeong et al. | |
| 2018/0063627 | A1 | 3/2018 | Kubba et al. | |
| 2018/0070166 | A1 | 3/2018 | Howell et al. | |
| 2020/0100010 | A1 | 3/2020 | Yang et al. | |
| 2020/0221213 | A1 | 7/2020 | Delhoume et al. | |
| 2020/0314526 | A1 | 10/2020 | Lee et al. | |
| 2021/0044886 | A1 | 2/2021 | Hsu et al. | |
| 2021/0227310 | A1 | 7/2021 | Yang et al. | |
| 2021/0250674 | A1 | 8/2021 | Jin et al. | |
| 2021/0281941 | A1 | 9/2021 | Saulsbury et al. | |
| 2021/0342032 | A1 | 11/2021 | Guo et al. | |

FOREIGN PATENT DOCUMENTS

| | | | |
|---|---|---|---|
| KR | 20150083715 | A | 7/2015 |
| KR | 20160071151 | A | 6/2016 |
| KR | 101744507 | B1 | 6/2017 |
| KR | 20170082022 | A | 7/2017 |
| KR | 20210047613 | A | 4/2021 |
| KR | 10-2021-0100928 | A | 8/2021 |
| KR | 20210101689 | A | 8/2021 |
| KR | 102607566 | B1 | 11/2023 |

OTHER PUBLICATIONS

International Search Report for PCT/KR2022/016746 mailed Feb. 7, 2023, 4 pages.

Written Opinion of the ISA for PCT/KR2022/016746 mailed Feb. 7, 2023, 3 pages.

Korean Office Action dated Dec. 30, 2025 for KR Application No. 10-2022-0027970.

India Office Action dated May 29, 2026 for IN Application No. 202447038654.

* cited by examiner

METHOD FOR SENSING WEARING OF ELECTRONIC DEVICE, AND ELECTRONIC DEVICE

CROSS-REFERENCE TO RELATED APPLICATIONS

This application is a continuation of International Application No. PCT/KR2022/016746 designating the United States, filed on Oct. 28, 2022, in the Korean Intellectual Property Receiving Office and claiming priority to Korean Patent Application Nos. 10-2021-0182944, filed on Dec. 20, 2021, and 10-2022-0027970, filed on Mar. 4, 2022, in the Korean Intellectual Property Office, the disclosures of each of which are incorporated by reference herein in their entireties.

BACKGROUND

Field

The disclosure relates to a method for sensing wearing of an electronic device, and an electronic device.

Description of Related Art

An electronic device may include a wearable electronic device that can be worn on a part of a user's body to enhance portability or user accessibility. The wearable electronic device may include an ear-wearable electronic device that are worn on the user's ears to listen to music or provide convenience in making calls. The wearable electronic device may include at least one antenna for transmitting or receiving data to or from an external device (e.g., a mobile terminal, augmented reality {AR} glasses).

The wearable electronic device, particularly, an ear-wearable electronic device, may include a touch sensing circuit for detecting a touch input. For example, the touch sensing circuit may include at least one conductive pattern disposed adjacent to a housing that forms the exterior of the wearable electronic device. The wearable electronic device may detect a user's touch input using the conductive pattern. The wearable electronic device may be configured in a shape (e.g., size) that can be worn on a portion of the user's body (e.g., ears), and malfunction may occur due to touch input while the wearable electronic device is being worn.

The wearable electronic device may further include a grip circuit for detecting not only a touch input but also a grip motion for wearing the wearable electronic device. For example, the grip circuit may include a conductive pattern disposed on a surface (e.g., area, grip area) that the user's fingers contact in a method in which the user holds the wearable electronic device. The grip circuit may further include a grip sensor, and may be electrically connected to the conductive pattern and/or grip sensor disposed adjacent to the housing of the wearable electronic device.

Therefore, the disclosure has been made in view of the above-mentioned problems, and the disclosure provides a wearable electronic device that identifies that wearing is completed when the wearable electronic device is worn on the ear, and performs a touch sensing function in accordance with a point in time when wearing is completed.

SUMMARY

Embodiments of the disclosure provide a wearable electronic device in which touch input malfunctions due to grip movements are reduced when the wearable electronic device is worn on the ear.

In accordance with an example embodiment of the disclosure, an electronic device may include: a grip sensor, a touch sensor, a wearing detection sensor, and at least one processor, comprising processing circuitry, electrically connected to the grip sensor, the touch sensor, and the wearing detection sensor. At least one processor, individually and/or collectively, may be configured to: identify a process of wearing the electronic device using the grip sensor and the wearing detection sensor, stop a touch sensing function for the touch sensor in response to the identified wearing process, measure at least one sensing value related to the wearing process using the grip sensor and the wearing detection sensor, identify completion of the wearing process based on the measured at least one sensing value, and resume the stopped touch sensing function in response to the identified completion of the wearing process.

In accordance with an example embodiment of the disclosure, a wearing detection method may include: identifying a wearing process for an electronic device using a grip sensor and a wearing detection sensor, stopping a touch sensing function for a touch sensor in response to the identified wearing process, measuring at least one sensing value related to the wearing process using the grip sensor and the wearing detection sensor, identifying completion of the wearing process based on the measured at least one sensing value, and resuming the stopped touch sensing function in response to the identified completion of the wearing process.

A wearable electronic device according to various example embodiments of the disclosure may use a plurality of sensors (e.g., a grip sensor, a touch sensor, and/or a wearing detection sensor) to detect a wearing process and/or a removal process for the wearable electronic device. The wearable electronic device may stop performing a touch sensing function on a touch sensor during the wearing process and/or the removal process to prevent and/or reduce malfunctions due to touch input that is not intended by the user.

According to various example embodiments, the wearable electronic device may stop the touch sensing function in a situation where the wearable electronic device is worn on a portion of the user's body or is removed from a part of the user's body. The wearable electronic device may prevent and/or reduce malfunctions due to touch input when the wearable electronic device is worn on and/or removed from a portion of the user's body, and convenience of use for the wearable electronic device may be improved. In addition, various effects that can be directly or indirectly identified through this disclosure may be provided.

BRIEF DESCRIPTION OF THE DRAWINGS

In relation to the description of the drawings, identical or similar reference numerals may be used for identical or similar components. Further, the above and other aspects, features and advantages of certain embodiments of the present disclosure will be more apparent from the following detailed description, taken in conjunction with the accompanying drawings, in which.

DETAILED DESCRIPTION

Figure 1:
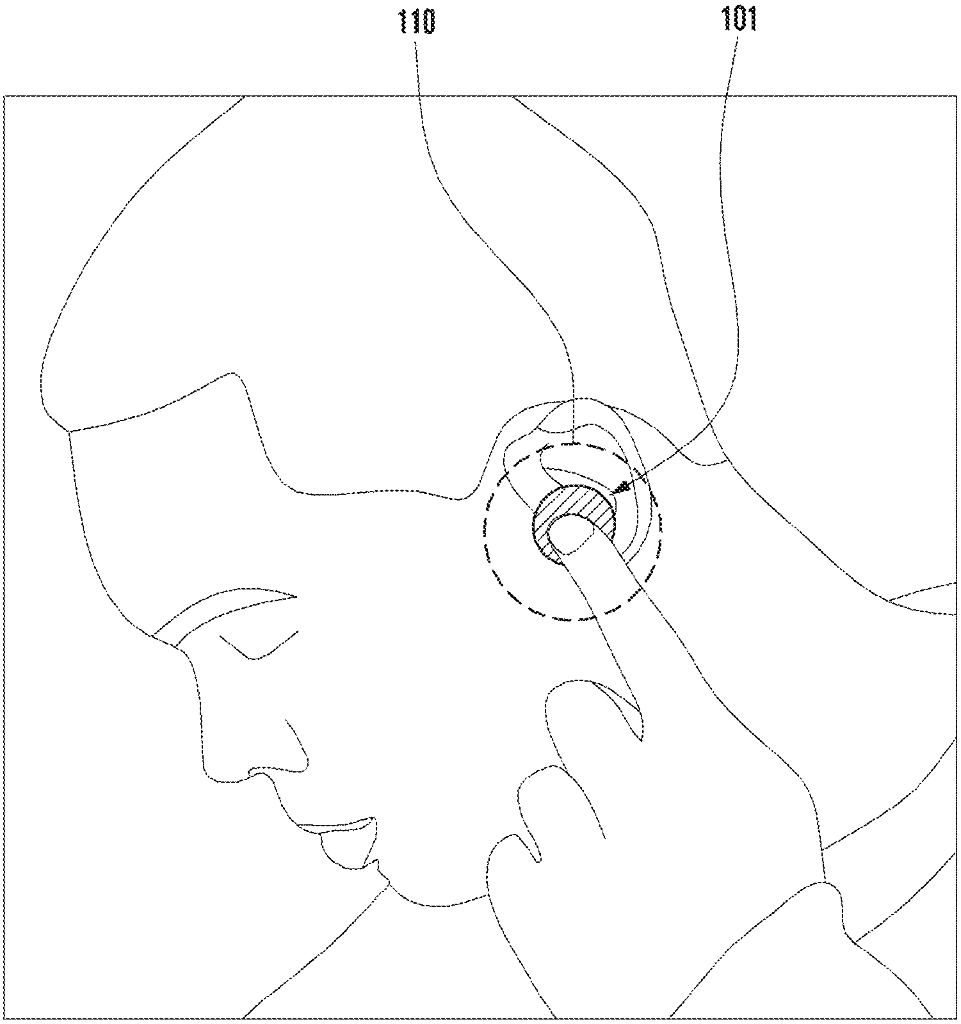
FIG. 1 is a diagram illustrating an example in which a wearable electronic device is worn on the human body according to various embodiments.

FIG. 1 is a diagram illustrating an example in which a wearable electronic device is worn on the human body according to various embodiments.

According to various embodiments, an electronic device 101 may include a wearable electronic device that can be worn on a portion of the user's body. For example, the electronic device 101 may include at least one of a wireless earphone, a wired earphone, and/or a head set that can be worn on the user's ears. The electronic device 101 may function as a speaker that provides an audio service (e.g., a music service) to the user, or function as a microphone (mic) that transmits the user's speech (e.g., a sound source) to an external electronic device. The electronic device 101 may be worn on a portion of the user's body and include a touch sensor for detecting the user's input (e.g., touch input).

According to an embodiment, the electronic device 101 may be worn in a location outside of the user's field of view, and include at least one sensor (e.g., a proximity sensor, an acceleration sensor, a gyro sensor, and/or a grip sensor) for determining whether wearing of the electronic device 101 is completed. The electronic device 101 may include a sensing area implemented based on a flexible printed circuit board (FPCB) and laser direct structuring (LDS) to detect a user's input, and a touch integrated circuit (IC) (e.g., a capacitive touch sensor) for converting the user's input into an analog to digital converter (ADC). For example, the capacitive touch sensor may detect a user's touch input based on the amount of change in capacitance. According to an embodiment, the electronic device 101 may include a touch sensor for detecting a user's touch input and a grip sensor for detecting whether the user grips the electronic device 101. For example, the touch sensor and the grip sensor may be implemented separately or integrated into one sensor module and implemented.

Referring to FIG. 1, the electronic device 101 may be worn on the user's ear, detect movement related to wearing using the grip sensor, and detect a user's touch input related to execution of functions of the electronic device 101 using the touch sensor. For example, the electronic device 101 may control the function of the touch sensor to be at least partially stopped (disabled) in a process in which the electronic device 101 is worn on the user's body (e.g., wearing process) and, based on a point in time when wearing is completed, control the function of the touch sensor to be resumed (enabled). According to an embodiment, the electronic device 101 may stop the function of the touch sensor in the process in which the electronic device 101 is worn (e.g., wearing process), and prevent and/or inhibit a specific function based on the touch sensor from malfunctioning.

Figure 2:
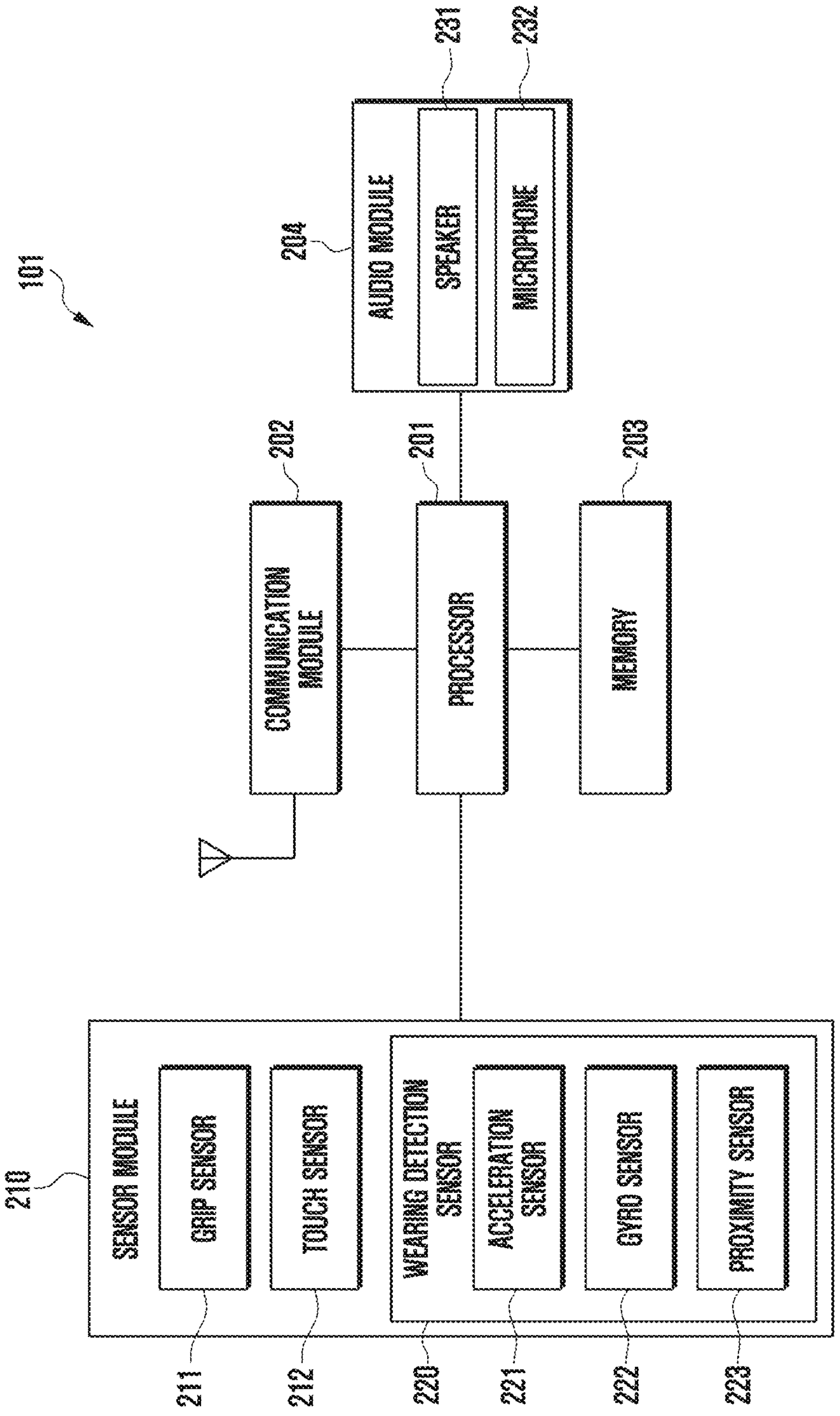
FIG. 2 is a block diagram illustrating an example configuration of a wearable electronic device according to various embodiments.

FIG. 2 is a block diagram illustrating an example configuration of a wearable electronic device according to various embodiments.

An electronic device of FIG. 2 (e.g., the electronic device 101 of FIG. 1) may be at least partially similar to the electronic device 101 of FIG. 1 or may further include various embodiments of the electronic device 101. According to an embodiment, the electronic device 101 may include a wearable electronic device (e.g., an ear-wearable electronic device, earphone) that can be worn on a portion of the user's body (e.g., ear).

Referring to FIG. 2, the electronic device 101 may include a processor (e.g., including processing circuitry) 201, a communication module (e.g., including communication circuitry) 202, a memory 203, an audio module (e.g., including audio circuitry) 204, and/or a sensor module (e.g., including at least one sensor) 210. According to various embodiments, in the electronic device 101, at least one of components shown in FIG. 2 may be omitted, or one or more other components may be added. According to various embodiments, some of these components may be implemented as a single integrated circuit.

According to an embodiment, the electronic device 101 may be worn on a portion of the user's body, and use at least one sensor (e.g., a grip sensor 211, a touch sensor 212, a wearing detection sensor 220) included in the sensor module 210 to subdivide and detect motions according to a wearing process (e.g., wearing process, wearing state). For example, the electronic device 101 may identify a point in time when a wearing process starts through the sensor module 210, and in response to the start of the wearing process, and stop a sensing function (e.g., touch sensing function) for at least one sensor. The electronic device 101 may identify a point in time when the wearing process is completed through the sensor module 210, and in response to the completion of the wearing process, resume the stopped sensing function (e.g., touch sensing function). For another example, the electronic device 101 may subdivide and detect a process of removing the electronic device 101 (e.g., removal processor) through the sensor module 210. The electronic device 101 may identify a point in time when the removal process starts and when the removal process is completed through the sensor module 210. According to an embodiment, the electronic device 101 may identify the wearing process and/or the removal process for the electronic device 101 and determine whether to execute the touch sensing function based on a predetermined condition. In an embodiment, it is possible to prevent and/or reduce malfunctions that may occur due to a user's touch input during the process of wearing the electronic device 101 and/or the process of removing the electronic device 101. In an embodiment, convenience of use for the electronic device 101 may be improved.

The processor 201 may, for example, include various processing circuitry and execute software to control at least one other component (e.g., a hardware or software component) of the electronic device 101 (e.g., a wearable electronic device) connected to the processor 201, and perform various data processing or computations. In an embodiment, as at least a part of data processing or computations, the processor 201 may load commands or data received from other components (e.g., communication module 202, audio module 204, and/or sensor module 210) into a volatile memory of the memory 203, process the commands or data stored in the volatile memory, and store the processed result data in a non-volatile memory. According to an embodiment, the processor 201 may use the at least one sensor included in the sensor module 210 to subdivide and identify the wearing process and/or removal process for the electronic device 101, and perform a predetermined operation to correspond to each process. The processor 201 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The communication module 202 may, for example, include various communication circuitry and support establishment of a direct (e.g. wired) communication channel or wireless communication channel between the electronic device 101 (e.g., a wearable electronic device) and an external electronic device (e.g., server, smartphone, personal computer {PC}, personal digital assistant {PDA}, or access point), and performance of communication through the established communication channel. According to an embodiment, the communication module 202 may be operated independently of the processor 201 and include one or more communication processors that support direct (e.g., wired) communication or wireless communication.

The communication module 202 may transmit and/or receive a signal or power to or from an external electronic device (e.g., smartphone) through, for example, at least one antenna (or antenna radiator). According to an embodiment, the communication module 202 may include a wireless communication module (e.g., short-range wireless communication module or global navigation satellite system {GNSS} communication module) and/or a wired communication module (e.g., local area network (LAN) communication module or power line communication module). Among these communication modules, the corresponding communication module may communicate with an external electronic device through a first network (e.g., short-range communication network such as Bluetooth, Bluetooth low energy {BLE}, near field communication {NFC}, wireless fidelity {Wi-Fi} direct, or infrared data association {IrDA}) and/or a second network (e.g. long-range communication network such as Internet or computer network {e.g., LAN or wide area network (WAN)}). These various types of communication modules may be integrated into one component (e.g., a single chip) or may be implemented as a plurality of separate components (e.g., multiple chips). According to an embodiment, the electronic device 101 may include a plurality of antennas, and the communication module 202 may select at least one antenna suitable for a communication method used in the communication network from the plurality of antennas. The electronic device 101 may transmit a signal and/or data to the external electronic device based on the at least one antenna selected by the communication module 202.

The memory 203 may store various data used by, for example, the at least one component of the electronic device 101 (e.g., processor 201, communication module 202, audio module 204, and/or sensor module 210). The data may include, for example, input data or output data for software (e.g., program) and commands related thereto. The memory 203 may include a volatile memory or a non-volatile memory. The program may be stored in the memory 203 as software and include, for example, an operating system (OS), middleware, or applications. For example, the memory 203 may store instructions related to various operations performed by the processor 201. According to an embodiment, the memory 203 may store various data related to the wearing process and/or removal process of the electronic device 101.

The audio module 204 may include various audio circuitry, including, for example, and without limitation, a speaker 231 for outputting an audio signal to the outside and/or a microphone 232 (e.g., mic) for receiving user's speech and external sounds. For example, the speaker 231 may output the audio signal to the outside of the electronic device 101. For example, since the electronic device 101 is worn on the user's ear, the processor 201 may output the audio signal toward the user's ear. A sound signal such as user's speech may be introduced into the microphone 232, and the introduced sound signal may be converted into an electrical signal through the microphone 232. According to an embodiment, the processor 201 may convert an audio signal into an electrical signal based on the audio module 204 or, conversely, convert an electrical signal into an audio signal. For example, the processor 201 may acquire an audio signal (e.g., user's speech) through the microphone 232, or output an audio signal (e.g., music) through the speaker 231. According to an embodiment, the audio module 204 may support an audio data collection function. The audio module 204 may play the collected audio data. The audio module 204 may include an audio decoder, a digital-to-analog converter (D/A converter), and/or an analog-to-digital converter (A/D converter). The audio decoder may convert audio data stored in the memory 203 into a digital audio signal. The D/A converter may convert the digital audio signal converted by the audio decoder into an analog audio signal. The speaker 231 may output the analog audio signal converted by the D/A converter. The A/D converter may convert the analog audio signal obtained through the microphone 142 into a digital audio signal.

The sensor module 210 may include various sensors and detect, for example, the operating state (e.g., temperature), movement, or position of the electronic device 101, and/or an external environmental state, and generate an electrical signal or data values corresponding to the detected state. The sensor module 210 may include a grip sensor 211, a touch sensor 212, and/or a wearing detection sensor 220, and the wearing detection sensor 220 may include at least one of an acceleration sensor 221, a gyro sensor 222, and/or a proximity sensor 223. According to an embodiment, the sensor module 210 is not limited to the sensors shown in FIG. 2 and include various types of sensors (e.g., geomagnetic sensor, magnetic sensor, temperature sensor, gesture sensor, or biometric sensor). According to an embodiment, the processor 201 of the electronic device 101 may detect a process of wearing the electronic device 101 on a portion of the human body (e.g., ear, earlobe) in detail based on the at least one sensor included in the sensor module 210. For example, the electronic device 101 may separately detect a wearing process in which the electronic device 101 is worn on the human body and a removal process in which the worn electronic device 101 is removed from the human body.

The grip sensor 211 may include a sensor that utilizes, for example, at least a partial area (e.g., first area) of the outer surface of a housing (e.g., housing 610 in FIG. 6A) and may include a grip detection circuit and a grip sensor IC. For example, the touch sensor 212 is a sensor that utilizes at least a partial area (e.g., second area) of the outer surface of the housing and may include a touch detection circuit and a touch sensor IC. According to an embodiment, the first area where the grip sensor 211 is placed and the second area where the touch sensor 212 is placed may be different areas. For example, the first area and the second area may be independent areas that do not overlap each other. According to an embodiment, the electronic device 101 may include a housing, when the electronic device 101 is worn on a portion of the human body, including a first surface (e.g., a first case 611 of FIG. 6A) that is exposed to an external environment and a second surface (e.g., second case 612 of FIG. 6A) that physically contacts the human body and is not exposed to the external environment. The electronic device 101 may include the grip sensor 211 that is electrically connected to at least one first conductive pattern disposed in the first area of the first surface and/or the touch sensor 212 that is electrically connected to a second conductive pattern disposed in the second area of the first surface located inside the first area. According to an embodiment, the grip sensor 211 and/or the touch sensor 212 may be designed to be integrated into one sensor IC.

According to an embodiment, a grip sensing circuit and a touch sensing circuit may include a conductive pattern located within the housing. For example, the grip sensing circuit may be electrically connected to the first conductive pattern and the touch sensing circuit may be electrically connected to the second conductive pattern. The grip sensor 211 may include the first conductive pattern disposed based on an area (e.g., first area) that is frequently touched when the user holds the electronic device 101. A partial area (e.g., first area) of the housing where the grip sensor 211 is disposed may be utilized as an input area (or key area) for detecting a user's grip motion (e.g., motion of holding the electronic device 101 with a finger when the electronic device 101 is griped). The touch sensor 212 may include the second conductive pattern disposed based on an area (e.g., second area) where a user's touch input occurs while the electronic device 101 is mounted on a portion of the human body. Another partial area (e.g., second area) of the housing where the touch sensor 212 is disposed may be utilized as an input area (or key area) for receiving or detecting a user input (e.g., touch input).

According to an embodiment, the grip sensor 211 and the touch sensor 212 may be implemented in a capacitive manner. Hereinafter, the sensing operation of the grip sensor 211 will be described in greater detail, and the touch sensor 212 may operate substantially the same as the sensing operation of the grip sensor 211. For example, a grip sensor IC (e.g., grip controller integrated circuit {IC}) may apply a voltage to the grip detection circuit, and the processor 201 may generate an electromagnetic field based on the grip detection circuit. For example, when the user grips the electronic device 101, the finger may touch a partial area of the housing where the grip sensor 211 is disposed or approach the partial area thereof within a threshold distance, and the electromagnetic field generated based on the grip detection circuit may change. When the electromagnetic field changes, the capacitance corresponding to the grip sensor 211 may change and the amount of change in the capacitance may exceed a predetermined threshold. When the amount of change in the capacitance exceeds the predetermined threshold, the grip sensor IC may generate an electrical signal based on a valid user input and transmit the generated electrical signal to the processor 201. The processor 201 may recognize a point (e.g., coordinates, area) where the user input occurs based on the electrical signal received from the grip sensor IC. The grip detection circuit and grip sensor IC may also be referred to as a grip sensor. The grip sensing circuit may include a conductive pattern (e.g., first conductive pattern) disposed near the housing for grip sensing. According to an embodiment, the touch sensor 212 may also be implemented in a capacitive manner and may operate substantially the same as the above-described sensing operation of the grip sensor 211.

According to an embodiment, the grip sensor IC and the touch sensor IC may convert an analog signal obtained through the detection circuit (e.g., grip detection circuit, touch detection circuit) into a digital signal. According to an embodiment, the grip sensor IC and the touch sensor IC may perform various functions such as noise filtering, noise removal, or sensing data extraction in relation to a signal according to a user input. According to an embodiment, the grip sensor IC and the touch sensor IC may include various circuits such as an analog-digital converter (ADC), a digital signal processor (DSP), and/or a micro control unit (MCU).

The wearing detection sensor 220 may detect the motion of the electronic device 101 being worn on a portion of the human body. For example, the wearing detection sensor 220 may include a sensor that utilizes at least a portion of the inner surface (e.g., the second case 612 in FIG. 6A) of the housing (e.g., the housing 610 in FIG. 6A), and may include the proximity sensor 223 and include the acceleration sensor 221 and the gyro sensor 222 which are disposed in the internal space of the electronic device 101. According to an embodiment, the acceleration sensor 221 and the gyro sensor 222 may detect the movement (e.g., degree of movement, direction of movement) and posture of the electronic device 101. For example, the proximity sensor 223 may include at least one optical sensor capable of detecting the external environment. The proximity sensor 223 may transmit an electrical signal obtained using the optical sensor to the processor 201, and the processor 201 may identify whether the electronic device 101 is worn on the user's body (e.g., ear) based on the electrical signal. According to an embodiment, based on at least one sensor included in the wearing detection sensor 220, the processor 201 may identify whether the electronic device 101 is mounted on a cradle (e.g., a stand and/or storage box on which the electronic device 101 is at least partially fixed), whether the electronic device 101 is picked up by the user and moved toward the ear, or whether the electronic device 101 is completely mounted based on the structure of the ear.

According to an embodiment, the processor 201 of the electronic device 101 may subdivide and detect motions according to the wearing process for the electronic device 101 based on the at least one sensor included in the sensor module 210. For example, the processor 201 may identify a situation in which the wearing process starts and a situation in which the wearing process is completed. For example, when the position of the electronic device 101 is changed by the user while the electronic device 101 is mounted on the cradle, the processor 201 may identify that the wearing process has started. According to an embodiment, the electronic device 101 may stop the touch sensing function for the touch sensor 212 from a point in time when the wearing process starts to a point in time when the wearing process is completed. For example, the processor 201 may use at least one of a method of ignoring user input according to touch sensing or a method of deactivating the touch sensor 212 to at least partially control the touch sensor 212 so that the touch sensing cannot be detected. The electronic device 101 may stop the touch sensing function until wearing is completed, thereby preventing and/or reducing malfunctions caused by a user's touch input during the wearing process.

According to an embodiment, the processor 201 may subdivide and detect motions according to the removal process for the electronic device 101 based on the at least one sensor included in the sensor module 210. For example, the processor 201 may identify a situation in which the removal process is in progress based on the sensing value of the at least one sensor. The processor 201 may stop the touch sensing function for the touch sensor 212 in response to the situation in which the removal process is in progress. The electronic device 101 may identify a situation in which removal for the electronic device 101 worn on the user's body is in progress, and stop the touch sensing function while the removal is in progress, thereby preventing and/or reducing malfunction of the user's touch input during the removal process.

According to various example embodiments, an electronic device (e.g., the electronic device 101 of FIG. 2) may include: a grip sensor (e.g., the grip sensor 211 of FIG. 2), a touch sensor (e.g., the touch sensor 212 of FIG. 2), a wearing detection sensor (e.g., the wearing detection sensor 220 of FIG. 2), and at least one processor, comprising processing circuitry (e.g., the processor 201 of FIG. 2), electrically connected to the grip sensor, the touch sensor, and the wearing detection sensor. At least one processor, individually and/or collectively, may be configured to: identify a wearing process for the electronic device using the grip sensor and the wearing detection sensor, stop a touch sensing function for the touch sensor in response to the identified wearing process, measure at least one sensing value related to the wearing process using the grip sensor and the wearing detection sensor, identify completion of the wearing process based on the measured at least one sensing value, and resume the stopped touch sensing function in response to the identified completion of the wearing process.

The electronic device according to an example embodiment may further include: a housing (e.g., the housing 610 of FIG. 6A) configured to be worn on a portion of the human body, wherein the housing may include, based on the electronic device being worn on a portion of the human body, a first surface (e.g., the first surface 621 of FIG. 6A) exposed to an external environment and a second surface (e.g., the second surface 622 of FIG. 6B) in physical contact with the human body and not exposed to the external environment.

According to an example embodiment, at least one processor, individually and/or collectively, may be configured to: may detect a grip input to a first area determined based on the first surface of the housing using the grip sensor, and detect a touch input to a second area determined based on the first surface of the housing using the touch sensor. Wherein first area and the second area may not overlap each other.

The electronic device according to an example embodiment may further include: at least one conductive pattern disposed in an internal space of the housing based on the first area, and a grip detection circuit electrically connected to the at least one conductive pattern, wherein at least one processor, individually and/or collectively, may be configured to: identify a grip input to the first area based on the grip detection circuit, and identify that the wearing process for the electronic device has started in response to the identification.

According to an example embodiment, at least one processor, individually and/or collectively, may be configured to: identify a grip sensing value for the first area based on the at least one conductive pattern, and identify that the grip input has occurred based on the identified grip sensing value.

According to an example embodiment, the wearing detection sensor may include at least one of an acceleration sensor (e.g., the acceleration sensor 221 of FIG. 2) disposed in the internal space of the housing, a gyro sensor (e.g., the gyro sensor 222 of FIG. 2), and a proximity sensor (e.g., the proximity sensor 223 of FIG. 2) disposed to correspond to a proximity sensing area determined based on the second surface of the housing, wherein at least one processor, individually and/or collectively, may be configured to: identify motion information and movement information on the electronic device using the acceleration sensor, identify angle information on the electronic device using the gyro sensor, and identify whether the electronic device is worn on a portion of the human body using the proximity sensor.

According to an example embodiment, at least one processor, individually and/or collectively, may configured to: measure sensing values for sensors included in the wearing detection sensor according to a configured period, and identify the state of the electronic device.

According to an example embodiment, at least one processor, individually and/or collectively, may be configured to: identify a state in which the electronic device is worn on the portion of the human body based on a proximity sensing value of the proximity sensor, and identify that a wearing process for the electronic device has been completed based on an acceleration sensing value of the acceleration sensor and a posture sensing value of the gyro sensor being within a specified range.

According to an example embodiment, a process from the start of the wearing process until the wearing process is completed may refer, for example, to the wearing process, and at least one processor, individually and/or collectively, may be configured to stop a touch sensing function for the touch sensor during the wearing process.

According to an example embodiment, at least one processor, individually and/or collectively, may be configured to: at least partially stop the touch sensing function during the wearing process, ignore an input through the touch sensor, or switch the touch sensor to a deactivated state.

According to an example embodiment, at least one processor, individually and/or collectively, may be configured to: identify a removal process for the electronic device using the grip sensor and the wearing detection sensor, measure at least one sensing value related to the removal process using the grip sensor and the wearing detection sensor, identify a state in which the removal process is in progress based on the measured at least one sensing value, and stop the touch sensing function for the touch sensor based on the removal process being in progress.

Figure 3:
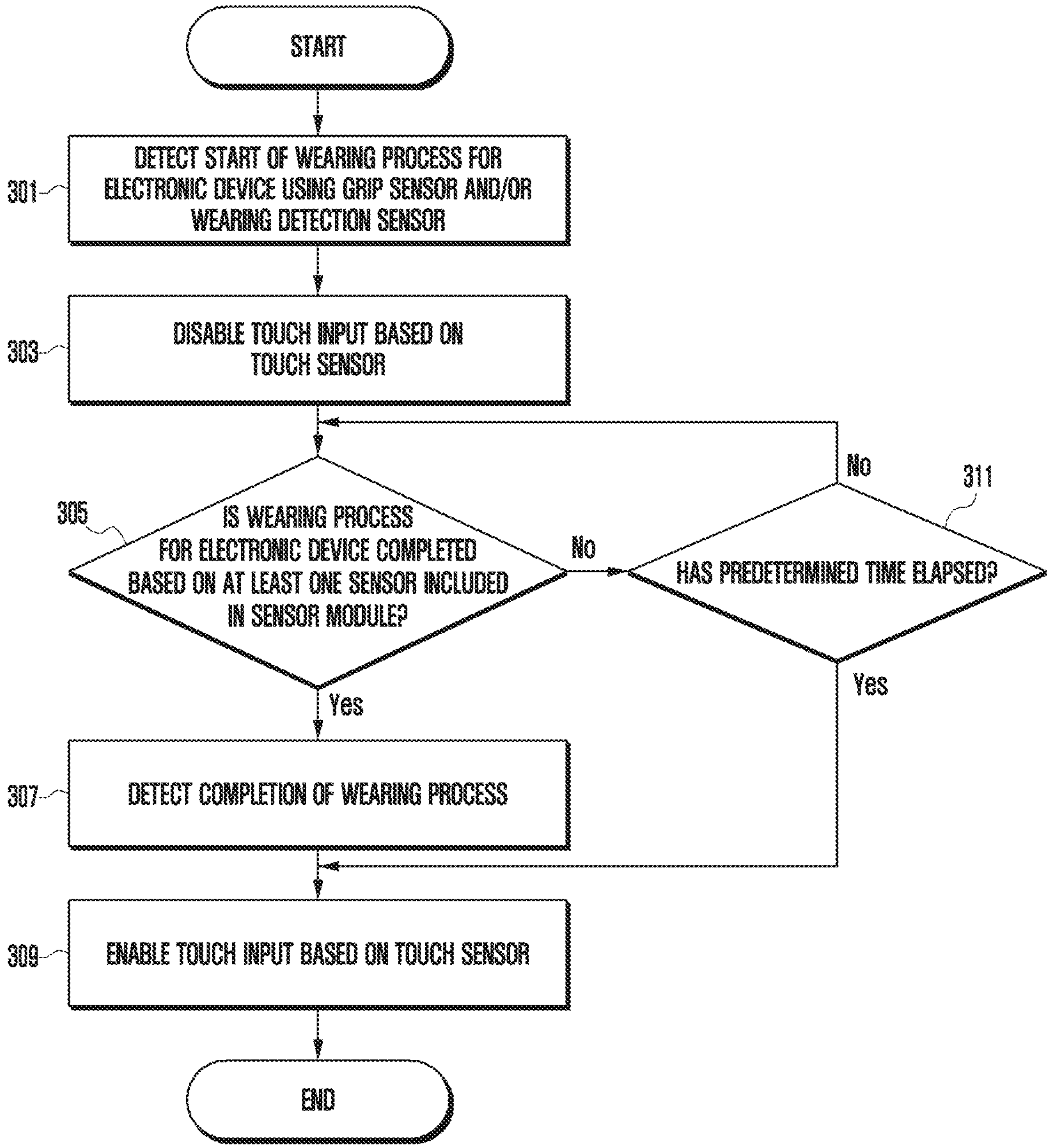
FIG. 3 is a flowchart illustrating an example method for identifying a wearing process of a wearable electronic device according to various embodiments.

FIG. 3 is a flowchart illustrating an example method for identifying a wearing process of a wearable electronic device according to various embodiments.

An electronic device (e.g., the electronic device 101 of FIG. 1) of FIG. 3 may be at least partially similar to the electronic device 101 of FIG. 2, or may further include various embodiments of the electronic device 101.

According to an embodiment, the electronic device 101 may be worn on a portion of the user's body, and use at least one sensor (e.g., a grip sensor {e.g., the grip sensor 211 of FIG. 2}, a touch sensor {e.g., the touch sensor 212 of FIG. 2}, a wearing detection sensor {e.g., the wearing detection sensor 220 of FIG. 2}) included in a sensor module (e.g., the sensor module 210 of FIG. 2) to subdivide and detect motions according to a wearing process. For example, the electronic device 101 may identify the start of the wearing process through the sensor module 210, and stop a sensing function (e.g., touch sensing function) for at least one sensor (e.g., the touch sensor 212) in response to the start of the wearing process. The electronic device 101 may identify completion of the wearing process through the sensor module 210, and resume (e.g., re-operate, re-execute) the stopped sensing function (e.g., touch sensing function) in response to completion of the wearing process.

Referring to FIG. 3, in operation 301, the processor (e.g., the processor 201 of FIG. 2) of the electronic device 101 may use the grip sensor 211 and/or the wearing detection sensor 220 to detect the start (e.g., a first time point) of the wearing process for the electronic device 101. For example, when the electronic device 101 is stored in a state mounted on a cradle, the processor 201 may detect a user's motion (e.g., grip motion) of picking up and lifting the electronic device 101 based on the grip sensor 211 and/or the wearing detection sensor 220. The processor 201 may detect movement of the electronic device 101 being gripped and lifted from the cradle and, in response to the detection, identify that the wearing process has started. For example, the processor 201 may use the grip sensor 211 to detect a state in which the electromagnetic field for the electronic device 101 changes, or use the acceleration sensor 221 and/or the gyro sensor 222 to identify that the wearing process has started based on the identified movement of the electronic device 101.

In operation 303, the processor 201 may stop (disable) a touch input (e.g., touch sensing function) based on the touch sensor 212. For example, the processor 201 may stop the touch sensing function of the touch sensor 212 in a software manner or at least partially deactivate the touch sensor 212 in a hardware manner. According to an embodiment, the processor 201 may stop the touch sensing function of the touch sensor 212 starting from a point in time when a wearing process operation is identified to a point in time when the wearing process is completed (e.g., a point in time when the electronic device 101 is completely worn on a user's body).

In operation 305, the processor 201 may determine whether the wearing process for the electronic device 101 has been completed based on at least one sensor (e.g., the grip sensor 211, the touch sensor 212, and/or the wearing detection sensor 220) included in the sensor module 210. For example, the processor 201 may identify a sensing value for the electronic device 101 based on at least one sensor of the acceleration sensor 221, the gyro sensor 222, and/or the proximity sensor 223 included in the grip sensor 211 and the wearing detection sensor 220, and determine whether the electronic device 101 is completely worn on the user's body through comparison with a reference value (e.g., threshold) stored in a memory (e.g., the memory 203 in FIG. 2). For example, the processor 201 may measure a first sensing value of a first channel and/or a second sensing value of a second channel for the grip sensor 211, and identify whether a sum of the first sensing value and the second sensing value exceeds a predetermined threshold. When the sum of the first sensing value and the second sensing value exceeds the predetermined threshold, the processor 201 may identify that the user's finger is holding the electronic device 101. When the sum of the first and second sensing values is less than or equal to the predetermined threshold, the processor 201 may identify that the electronic device 101 is in a non-gripped state. According to an embodiment, a state in which the sensing value exceeds the threshold is defined as a gripped state, and a state in which the sensing value is less than or equal to the threshold is defined as a non-gripped state, but are not limited thereto. According to an embodiment, the state in which the sensing value exceeds the threshold may be defined as the non-gripped state, and the state in which the sensing value is less than or equal to the threshold may be defined as the gripped state.

For another example, the processor 201 may identify the number of times the sum of the first and second sensed values reaches a predetermined peak threshold according to a predetermined period. When the number of times the sum thereof exceeds a designated number of times, the processor 201 may identify that the user's finger is holding the electronic device 101. As another example, the processor 201 may measure a sensing value at a predetermined period based on the acceleration sensor 221, the gyro sensor 222, and/or the proximity sensor 223. The processor 201 may use the acceleration sensor 221 to identify motion information and/or movement information about the electronic device 101, use the gyro sensor 222 to identify angle information about the electronic device 101, and use the proximity sensor 223 to identify whether the electronic device 101 is in physical contact with the human body.

In operation 307, the processor 201 may identify (e.g., detect) that the wearing process for the electronic device 101 has been completed. For example, when there is no movement of the electronic device 101 for a certain period of time, the posture of the electronic device 101 is maintained within a predetermined angle range, and a portion (e.g., proximity sensing area) of the proximity sensor 223 is physically contacted by the human body, the processor 201 may identify that the electronic device 101 has been completely worn on the human body. The processor 201 may measure the first sensing value of the first channel and the second sensing value of the second channel for the grip sensor 211, and identify that the sum of the first sensing value and the second sensing value does not exceed the predetermined threshold. According to an embodiment, the processor 201 may combine sensing values for at least two sensors among the sensors included in the sensor module 210, and based on the combined value, determine whether the electronic device 101 has been completely worn on the human body.

When the electronic device 101 has been completely worn on the human body (e.g., when the sum of the first sensing value and the second sensing value does not exceed the predetermined threshold), in operation 309, the processor 201 may enable a touch input (e.g., the touch sensing function) based on the touch sensor 212. For example, the processor 201 may resume the touch sensing function for the touch sensor 212 in a software manner, or at least partially activate the touch sensor 212 being in a deactivated state in a hardware manner. According to an embodiment, in response to completion of the wearing process, the processor 201 may resume the touch sensing function for the touch sensor 212.

When the wearing process is not completed in operation 305 (e.g., when the sum of the first sensing value and the second sensing value exceeds the predetermined threshold), in operation 311, the processor 201 may identify whether predetermined time has elapsed. For example, when the electronic device 101 is not completely worn on the human body, the processor 201 may maintain a standby state for a predetermined time. When the predetermined time has elapsed, in operation 309, the processor 201 may resume the touch sensing function for the touch sensor 212. For example, in operation 309, the processor 201 may re-execute (e.g., activate) the stopped touch sensing function.

According to an embodiment, the processor 201 may identify at least one motion related to completion of the wearing process for the electronic device 101 while proceeding from operation 305 to operation 311. For example, the processor 201 may identify at least one state (motion) among a state in which there is no movement of the electronic device 101 for a predetermined time, a state in which the posture of the electronic device 101 is maintained within a predetermined angle range, a state in which a portion of the proximity sensor 223 is physically contacted by the human body, and/or a state in which a portion of the grip sensor 211 is non-gripped. The processor 201 may identify the at least one operation related to the completion of the wearing process, and identify whether a predetermined time has elapsed in operation 311.

According to an embodiment, the processor 201 of the electronic device 101 may ignore the touch sensing function through the touch sensor 212 while the electronic device 101 is worn on a portion of the user's body (e.g., wearing process), and prevent and/or reduce malfunction of the electronic device 101 through the touch sensor 212. When the electronic device 101 is completely worn on the portion of the user's body, the processor 201 may resume the touch sensing function to be re-executed through the touch sensor 212. According to an embodiment, the electronic device 101 may ignore a user touch input in a form not intended by the user until the electronic device 101 is completely worn on the human body, and prevent and/or reduce malfunction due to the user's touch input.

Figure 4:
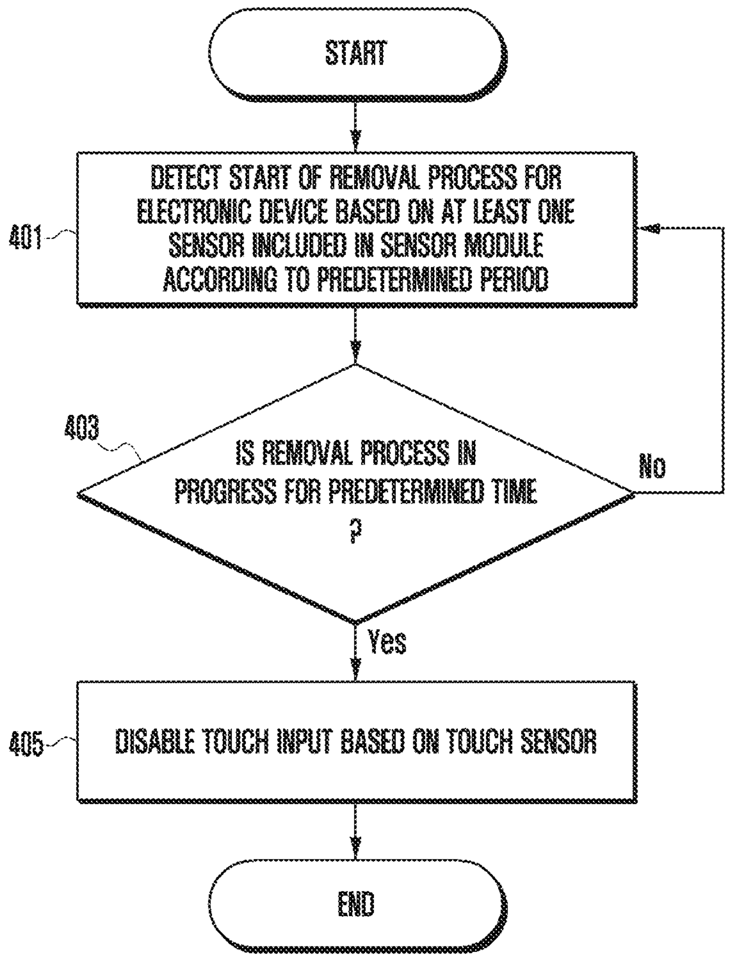
FIG. 4 is a flowchart illustrating an example method for identifying a removal process for a wearable electronic device according to various embodiments.

FIG. 4 is a flowchart illustrating an example method for identifying a removal process for a wearable electronic device according to various embodiments.

An electronic device (e.g., the electronic device 101 of FIG. 1) of FIG. 4 may be at least partially similar to the electronic device 101 of FIG. 2, or may further include various embodiments of the electronic device 101.

According to an embodiment, the electronic device 101 may be removed while worn on a portion of the user's body, and use at least one sensor (e.g., a grip sensor {e.g., the grip sensor 211 of FIG. 2}, a touch sensor {e.g., the touch sensor 212 of FIG. 2}, a wearing detection sensor {e.g., the wearing detection sensor 220 of FIG. 2}) included in a sensor module (e.g., the sensor module 210 of FIG. 2) to subdivide and detect motions according to a removal process. For example, the electronic device 101 may identify whether the removal process is in progress through the sensor module 210, and stop at least one sensing function (e.g., touch sensing function) while the removal process is in progress.

Referring to FIG. 4, in operation 401, a processor (e.g., the processor 201 of FIG. 2) of the electronic device 101 may detect the start of the removal process for the electronic device 101 based on the at least one sensor (e.g., the grip sensor 211 and/or the wearing detection sensor 220) included in the sensor module 210 according to a predetermined period (e.g., about 100 Hz). For example, in a state in which the electronic device 101 is completely worn on a portion (e.g., ear) of the human body, the processor 201 may detect a user's motion of detaching the electronic device 101 from the human body based on the wearing detection sensor 220. For example, in response to a grip motion for the electronic device 101, the processor 201 may identify a change in the sensing value for the at least one sensor (e.g., the grip sensor 211 and/or the wearing detection sensor 220) included in the sensor module 210. The processor 201 may identify that the removal process has started based on a point in time when the electronic device 101 is gripped and detachable from the human body. According to an embodiment, the electronic device 101 may identify the sensing value of the at least one sensor included in the sensor module 210 and detect the start of the removal process.

In operation 403, the processor 201 may determine whether the removal process for the electronic device 101 is in progress for a predetermined time based on the at least one sensor included in the sensor module 210. For example, the processor 201 may identify a sensing value for the electronic device 101 based on at least one sensor of the grip sensor 211, the touch sensor 212, and/or the wearing detection sensor 220 (e.g., the acceleration sensor 221, the gyro sensor 222, and/or the proximity sensor 223), and determine whether the electronic device 101 is detached from the user's body through comparison with a reference value (e.g., threshold) stored in a memory (e.g., the memory 203 of FIG. 2). For example, the processor 201 may identify whether a sum of a first sensing value of a first channel and a second sensing value of a second channel for the grip sensor 211 exceeds a predetermined threshold. When the sum of the first sensing value and the second sensing value exceeds the predetermined threshold, the processor 201 may identify that the user's finger is holding the electronic device 101. When the sum of the first sensing value and the second sensing value is less than or equal to the predetermined threshold, the processor 201 may identify that the electronic device 101 is in a non-gripped state. According to an embodiment, a state in which the sensing value exceeds the threshold is defined as a gripped state, and a state in which the sensing value is less than or equal to the threshold is defined as a non-gripped state, but are not limited thereto. According to an embodiment, the state in which the sensing value exceeds the threshold may be defined as the non-gripped state, and the state in which the sensing value is less than or equal to the threshold may be defined as the gripped state. According to an embodiment, the processor 201 may combine sensing values for at least two sensors among the sensors included in the sensor module 210, and based on the combined value, identify the state of the electronic device 101 (e.g., a state where the removal process starts, a state where the removal process is in progress, a state where the removal process is completed).

According to an embodiment, the processor 201 may measure the sensing value according to a predetermined period based on the acceleration sensor 221, the gyro sensor 222, and/or the proximity sensor 223. The processor 201 may identify motion information about the electronic device 101 using the acceleration sensor 221, identify angle information about the electronic device 101 using the gyro sensor 222, and identify whether the electronic device 101 is in physical contact with the human body using the proximity sensor 223. According to an embodiment, after the electronic device 101 gripped by the user is detached from the human body, when the electronic device 101 is inserted into a cradle so that a situation where the grip on the electronic device 101 is cancelled is detected, the processor may identify that the removal process has been completed.

When it is identified that the removal process is in progress in operation 403, in operation 405, the processor 201 may stop (disable) a touch input (e.g., touch sensing function) based on the touch sensor 212. For example, the processor 201 may limit the touch sensing function of the touch sensor 212 in a software manner or at least partially deactivate the touch sensor 212 being in an activated state in a hardware manner. In response to a situation in which the user maintains a grip while removing the electronic device 101 from the ear (e.g., a situation in which the removal process is in progress), the processor 201 may stop the touch input (e.g., touch sensing function) based on the touch sensor 212. According to an embodiment, in response to the situation in which the removal process is in progress, the processor 201 may at least partially limit the touch sensing function for the touch sensor 212.

According to an embodiment, when it is identified that the electronic device 101 is detached from the user's ear and inserted into the cradle or when there is no movement of the electronic device 101 for a predetermined time after a grip motion on the electronic device 101 is cancelled, the processor 201 may identify that the removal process has been completed.

According to an embodiment, the processor 201 of the electronic device 101 may identify a process (e.g., removal process) in which the electronic device 101 is removed from the user's body, and ignore the touch sensing function through the touch sensor 212 in response to the situation where the removal process is in progress. According to an embodiment, the electronic device 101 may at least partially stop the touch sensing function while the grip motion on the electronic device 101 is maintained (e.g., situation where the removal process is in progress) starting from a point in time when the electronic device 101 is detached from the human body, and reduce unnecessary power consumption (e.g., battery consumption) due to use of the touch sensing function.

Figure 5A:
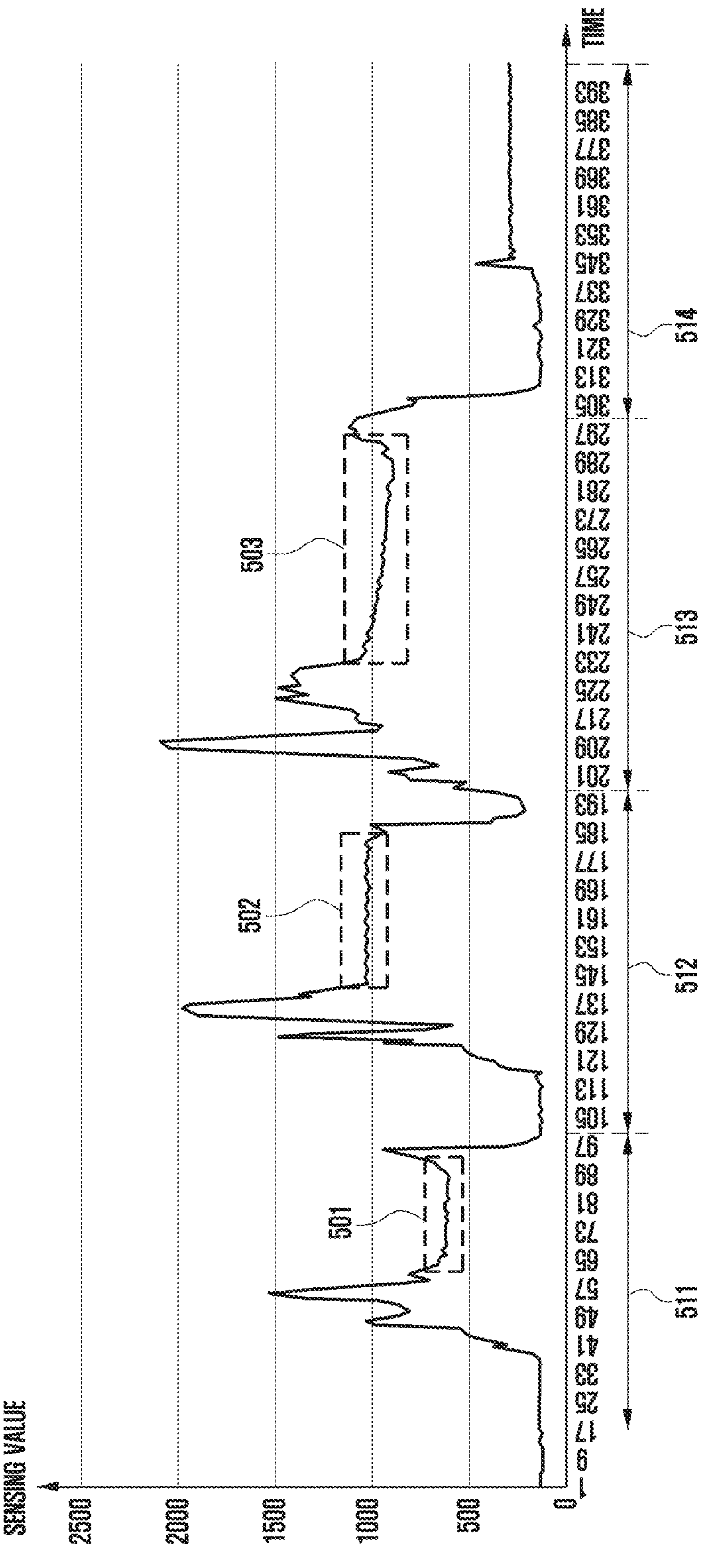
FIG. 5A is a first graph illustrating a sensing value for a proximity sensor when a wearing process for a wearable electronic device is performed according to various embodiments.

FIG. 5A is a first graph illustrating a sensing value for a proximity sensor when a wearing process for a wearable electronic device is performed according to various embodiments.

The electronic device of FIG. 5A (e.g., the electronic device 101 of FIG. 1) may be at least partially similar to the electronic device 101 of FIG. 2, or may further include various embodiments of the electronic device 101.

According to an embodiment, the electronic device 101 may be worn on a portion of the user's body, and use at least one sensor (e.g., a grip sensor {e.g., the grip sensor 211 of FIG. 2}, a touch sensor {e.g., the touch sensor 212 of FIG. 2}, a wearing detection sensor {e.g., the wearing detection sensor 220 of FIG. 2}) included in a sensor module (e.g., the sensor module 210 of FIG. 2) to identify whether the electronic device 101 is appropriately worn on a portion (e.g., ear) of the human body. The electronic device 101 may stop the touch sensing function for the touch sensor 212 until the electronic device 101 is completely worn on a portion of the human body, and prevent and/or reduce malfunction that may occur due to a touch input to the touch sensor 212.

According to an embodiment, a processor (e.g., the processor 201 of FIG. 2) of the electronic device 101 may measure a sensing value for a proximity sensor (e.g., the proximity sensor 223 of FIG. 2) according to a predetermined period, and determine whether the electronic device 101 is completely worn on the portion of the human body. Referring to FIG. 5A, a graph showing the sensing value by the proximity sensor 223 based on predetermined periods 511, 512, 513, and 514 is illustrated.

Referring to FIG. 5A, the processor 201 may measure the sensing value of the proximity sensor 223 according to the predetermined periods (e.g., about 100 ms) 511, 512, 513, and 514. For example, when the sensing value of the proximity sensor 223 is maintained within a predetermined change range (e.g., between about +100 and about −100) for a predetermined time (e.g., about 50 ms), it is determined that the electronic device 101 is completely worn on the portion of the human body. Referring to FIG. 5A, the processor 201 may identify that wearing for the electronic device 101 is completed based on the sensing value measured within a first range 501 of the first period 511. The processor 201 may identify that wearing for the electronic device 101 is completed based on the sensing value measured within a second range 502 of the second period 512. The processor 201 may identify that wearing for the electronic device 101 is completed based on the sensing value measured within a third range 503 of the third period 513. Meanwhile, the processor 201 may measure the sensing value of the proximity sensor 223 during the fourth period 514, but identify that a reference condition is not satisfied, and identify that the electronic device 101 has been removed from the portion of the human body.

According to an embodiment, the processor (e.g., the processor 201 of FIG. 2) of the electronic device 101 may measure a sensing value of an acceleration sensor (e.g., the acceleration sensor 221 of FIG. 2), and determine whether the electronic device 101 is completely worn on the portion of the human body. For example, the sensing value of the acceleration sensor 221 may include an x-axis angle deviation value (roll angle variance), a y-axis angle deviation value (pitch angle variance), an x-axis angle difference value (roll angle diff), and/or a y-axis angle difference value (pitch angle diff). The processor 201 may identify the amount of angle change for the electronic device 101 based on the x-axis angle deviation value and/or the y-axis angle deviation value. The processor 201 may identify a posture difference of the electronic device 101 based on the x-axis angle difference value and/or the y-axis angle difference value. For example, when the x-axis angle value is within a range of about −6 degrees to about −30 degrees and the y-axis angle value is within a range of about −18 degrees to about +18 degrees, the processor 201 may determine that the electronic device 101 is completely worn on the portion of the human body. In addition, the processor 201 may determine whether the posture of the electronic device 101 has changed in any form for the corresponding time based on a time difference value for calculating the x-axis angle difference value and/or the y-axis angle difference value. For example, the processor 201 may measure the sensing value of the acceleration sensor 221 using Equation 1 and Equation 2 below.

$$\text{angle}(X) = \tan^{-1}\left(\frac{-AcY}{\sqrt{Ac^2X + Ac^2Z}}\right) * \left(\frac{180°}{\pi}\right) \quad \text{[Equation 1]}$$

$$\text{angle}(Y) = \tan^{-1}\left(\frac{-AcX}{\sqrt{Ac^2Y + Ac^2Z}}\right) * \left(\frac{180°}{\pi}\right) \quad \text{[Equation 2]}$$

According to an embodiment, in the process of wearing the electronic device 101 on the portion of the human body, an external force (e.g., a user's gesture, motion) may be generated in the electronic device 101, and a change in the signal may be generated based on a low frequency band. The processor 201 may limit only the low frequency band to extract only the external force and measure the signal change in the low frequency band.

According to an embodiment, the electronic device 101 may determine whether the electronic device 101 is completely worn on the portion of the human body based on the sensing value (e.g., the x-axis angle deviation value, the y-axis angle deviation value, the x-axis angle difference value, and/or the y-axis angle difference value) of the acceleration sensor 221.

According to an embodiment, the processor 201 may combine the sensing values of at least two or more sensors among the sensors included in the sensor module 210, and based on the combined value, identify the state of the electronic device 101 (e.g., a state in which the removal process starts, a state in which the removal process is in progress, and/or a state in which the removal process is completed).

According to an embodiment, the sensing value measured by the electronic device 101 is not limited to the sensing value of the proximity sensor and/or the sensing value of the acceleration sensor. According to an embodiment, a condition in which the electronic device 101 is completely worn on the portion of the human body may be configured according to various algorithms and is not limited to a specific sensor.

Figure 5B:
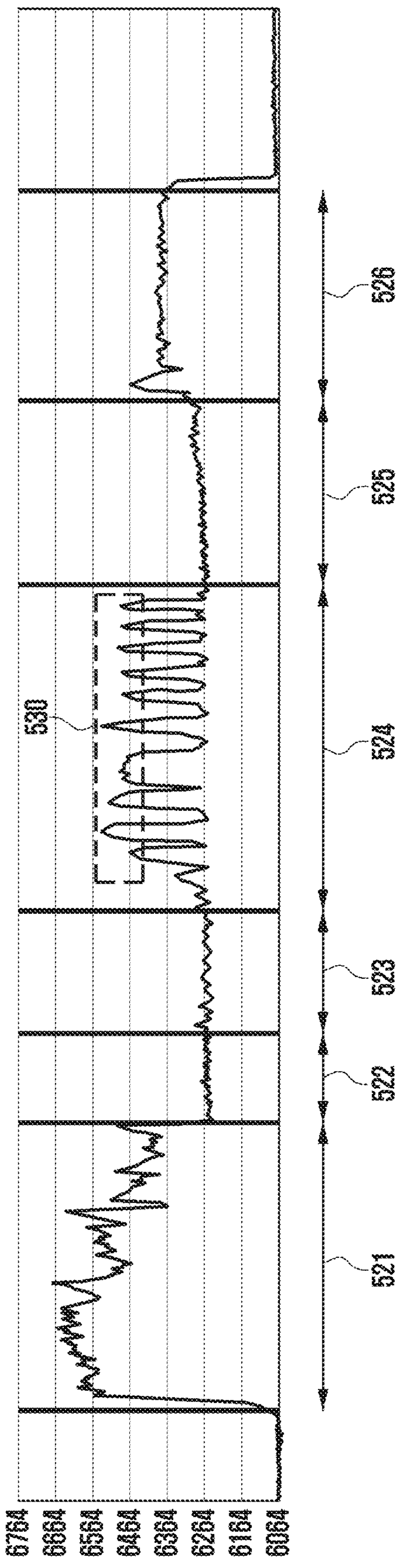
FIG. 5B is a second graph illustrating a sensing value for a grip sensor when a wearing process for a wearable electronic device is performed according to various embodiments.

FIG. 5B is a second graph illustrating a sensing value for a grip sensor when a wearing process for a wearable electronic device is performed according to various embodiments.

The electronic device of FIG. 5B (e.g., the electronic device 101 of FIG. 1) may be at least partially similar to the electronic device 101 of FIG. 2, or may further include various embodiments of the electronic device 101.

According to an embodiment, the electronic device 101 may be worn on a portion of the user's body, and use at least one sensor (e.g., a grip sensor {e.g., the grip sensor 211 of FIG. 2}, a touch sensor {e.g., the touch sensor 212 of FIG. 2}, a wearing detection sensor {e.g., the wearing detection sensor 220 of FIG. 2}) included in a sensor module (e.g., the sensor module 210 of FIG. 2) to identify whether the electronic device 101 is appropriately worn on a portion (e.g., ear) of the human body. The electronic device 101 may stop the touch sensing function for the touch sensor 212 until the electronic device 101 is completely worn on a portion of the human body, and prevent and/or reduce malfunction that may occur due to a touch input to the touch sensor 212.

Referring to FIG. 5B, a change in the sensing values of the grip sensor 211 according to the occurrence of an event is illustrated. For example, the sensing values may be divided into a first section 521 to a sixth section 526 (521, 522, 523, 524, 525, 526). The first section 521 may be a state in which the user picks up the electronic device 101 and lifts it (e.g., grip motion) in order to wear the electronic device 101 on a portion of the human body. The processor 201 may identify that a user's touch input to a grip sensing area corresponding to the grip sensor 211 occurs irregularly and frequently in the first section 521. In the second section 522, the electronic device 101 may be worn on the portion of the human body (e.g., an ear). The processor 201 may identify that a predetermined sensing value is maintained while the user's touch input to the grip sensing area does not occur for a predetermined time, and determine that wearing for the electronic device 101 has been completed in the second section 522. The third section 523 may be a state in which the user's touch input occurs on a touch sensing area rather than the grip sensing area in the electronic device 101 for which wearing has been completed. In the second section 522 and the third section 523, the sensing value for the grip sensor 211 may be maintained within a predetermined range. The fourth section 524 may be a state in which a user's touch input 530 occurs on the grip sensing area. The processor 201 may measure the sensing value of the grip sensor 211 according to a predetermined period and identify the sensing value (e.g., peak value, average value) based on the user's touch input 530. For example, the processor 201 may identify whether a touch input 530 to the touch sensor 212 has occurred based on an average value of the sensing values measured in the fourth section 524. The fifth section 525 may be a state in which no user's touch input occurs in the grip sensing area. In the second section 522, third section 523, and fifth section 525, the sensing value for the grip sensor 211 may be maintained within a predetermined range. The sixth section 526 may be a state in which the user's touch input to the grip sensing area occurs to detach the electronic device 101 from the portion of the human body. For example, the sixth section 526 may include a situation in which a detachment operation for the electronic device 101 occurs while the electronic device 101 is worn on the user's ear (e.g., the removal process).

According to an embodiment, the electronic device 101 may use a grip sensor (e.g., the grip sensor 211 of FIG. 2) included in a sensor module (e.g., the sensor module 210 of FIG. 2) to identify the state of the electronic device 101 (e.g., wearing state {a state in which wearing process is in progress}, wearing-completed state (a state in which wearing process is completed), and/or detaching state (a state in which removal process is in progress). According to an embodiment, the electronic device 101 may identify a plurality of sensing values for a plurality of sensors among the sensors included in the sensor module 210, and detect the state of the electronic device 101 based on the plurality of sensing values.

Figure 6A:
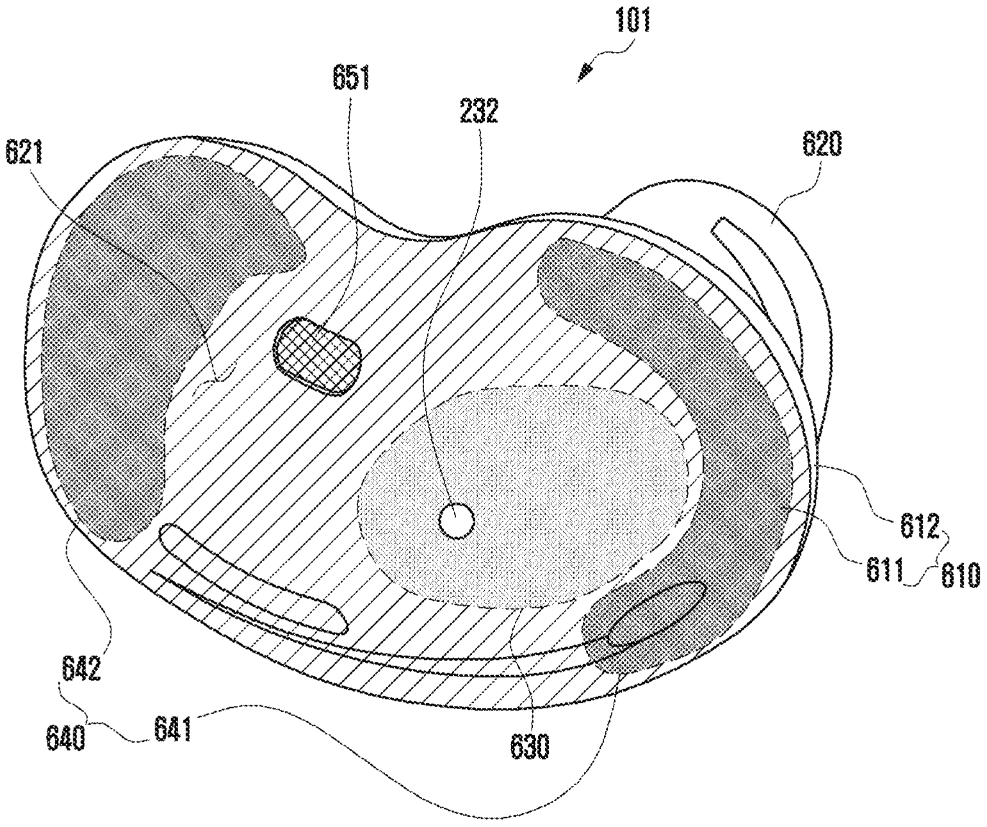
FIG. 6A is a perspective view illustrating a first surface of a wearable electronic device that is exposed to an external environment when the wearable electronic device is worn on the human body according to various embodiments.
Figure 6B:
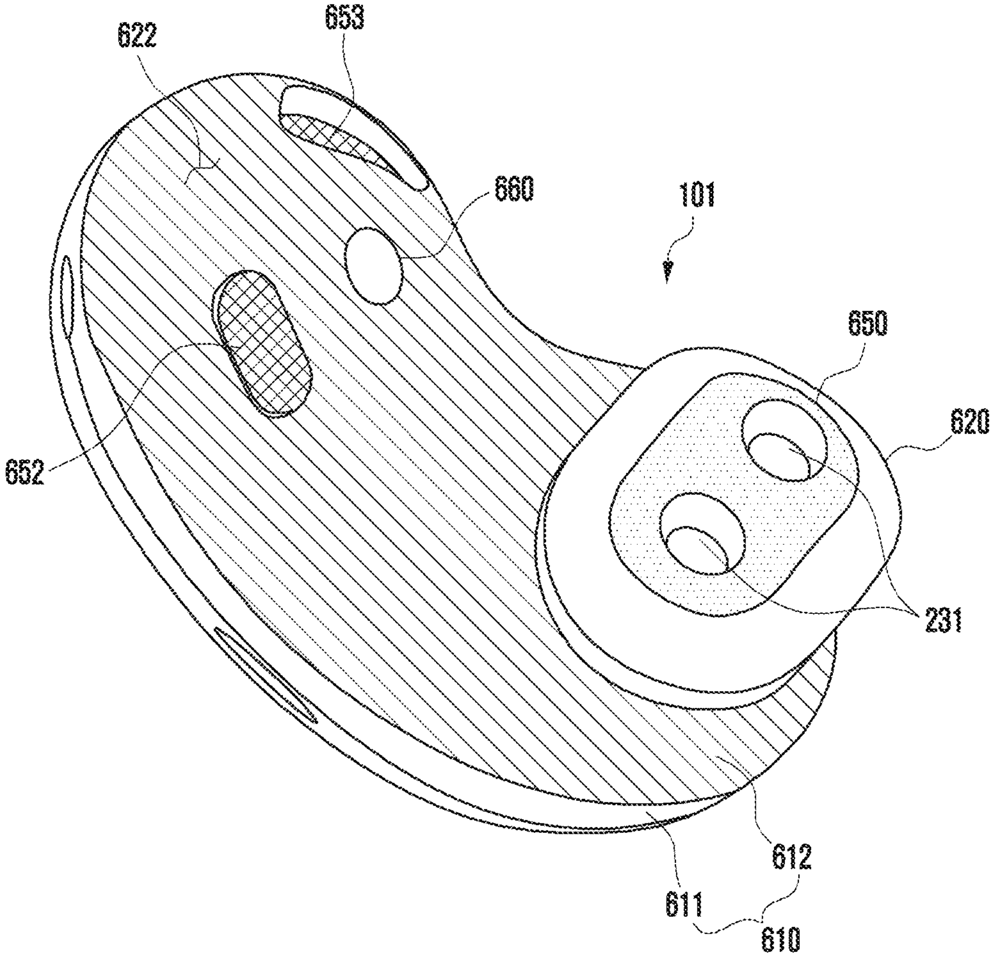
FIG. 6B is a perspective illustrating a second surface of a wearable electronic device that is at least partially in contact with the human body when the wearable electronic device is worn on the human body according to various embodiments.

FIG. 6A is a perspective view illustrating a first surface of a wearable electronic device that is exposed to an external environment when the wearable electronic device is worn on the human body, according to various embodiments. FIG. 6B is a diagram illustrating a second surface of a wearable electronic device that is at least partially in contact with the human body when the wearable electronic device is worn on the human body according to various embodiments.

The electronic device of FIGS. 6A and 6B (e.g., the electronic device 101 of FIG. 1) may be at least partially similar to the electronic device 101 of FIG. 2, or may further include various embodiments of the electronic device 101.

Referring to FIGS. 6A and 6B, the electronic device 101 may include a first case 611, a housing 610 including a second case 212 at least partially coupled to the first case 611, and/or an ear tip 620 detachably coupled to the housing 610. For example, the first case 611 may include a first surface 621 (e.g., outside surface) exposed to an external environment when the electronic device 101 is worn on a portion of the human body (e.g., an ear). The second case 612 may include a second surface 622 (e.g., inside surface) that is in physical contact with the human body when the electronic device 101 is worn on the portion of the human body. The housing 610 of the electronic device 101 may be at least partially implemented in a shape that can be worn on the user's ear. For example, the ear tip 620 may be made of an elastic material (e.g., rubber or silicone) with a size that can be at least partially inserted into the user's ear (e.g., external auditory canal). The electronic device 101 may have an outer sound hole 651 (e.g., an air passage, an outer sound path {e.g., a hole region, a grille region}) and/or an external microphone (e.g., microphone 232 in FIG. 2) for receiving external sounds which are disposed in a partial area of the first surface 621 exposed to the external environment. For example, the outer sound hole 651 (e.g., outer sound path) may be used as an air passage through which air moves between the inner space of the electronic device 101 and the external environment. For example, the outer sound hole 651 may be connected to the inner sound holes 652 and 653 disposed on the second surface 622 (e.g., the inner surface), and the outer sound hole 651 and the inner sound hole 652 and 653 may be utilized as an integrated air passage. Referring to FIG. 6B, when the electronic device 101 is worn on the portion of the human body, the electronic device 101 may include the inner sound holes 652 and 653 (e.g., inner sound path) disposed in a portion of the second surface 622 that is in physical contact with the human body. According to an embodiment, in the electronic device 101, a speaker (e.g., the speaker 231 in FIG. 2) and/or a microphone (e.g., the microphone 232 in FIG. 2) may be disposed at least partially along a connection passage connecting the outer sound hole 651 and the inner sound holes 652 and 653. For example, the connection passage (not shown) may be at least partially connected to the speaker 231 and/or microphone 232 disposed in the interior space of the housing 610 of the electronic device 101. Referring to FIG. 6B, the electronic device 101 may include a speaker (e.g., the speaker 231 of FIG. 2) for outputting an audio signal.

According to an embodiment, the electronic device 101 may at least partially include a grip sensing area 640 corresponding to a grip sensor (e.g., the grip sensor 211 of FIG. 2) on the first surface 621 (e.g., the outer surface), and a touch sensing area 630 corresponding to the touch sensor (e.g., the touch sensor 212 of FIG. 2). For example, the touch sensing area 630 and the grip sensing area 640 do not overlap each other, and may be determined at least partially based on the first surface 621 of the first case 611. The grip sensing area 640 may include a first grip sensing area 641 and a second grip sensing area 642, and may be determined based on an area physically contacted when the user picks up the electronic device 101. The touch sensing area 630 may be determined based on an area where a user's touch input is easy to occur while the electronic device 101 is completely worn on the portion of the human body. The processor of the electronic device 101 (e.g., the processor 201 in FIG. 2) may recognize the user input for the touch sensing area 630 and the user input for the grip sensing area 640 separately.

According to an embodiment, the electronic device 101 may at least partially include a proximity sensing area 650 corresponding to a proximity sensor (e.g., the proximity sensor 223 in FIG. 2) on the second surface 622 (e.g., the inner surface). For example, the proximity sensing area 650 may be determined based on an area where physical contact with the human body occurs relatively frequently when the electronic device 101 is worn. A wearing detection sensor 660 may be at least partially disposed on the second surface 622 of the electronic device 101. For example, the wearing detection sensor 660 may be disposed at a point that physically contacts the human body when the electronic device 101 is worn on the portion of the human body (e.g., an ear). According to an embodiment, the electronic device 101 may detect whether the electronic device 101 is worn on the portion of the human body through the proximity sensor 223 and the wearing detection sensor 660.

According to an embodiment, the electronic device 101 may include a first conductive pattern (e.g., a grip sensing circuit) disposed to correspond to the grip sensing area 640 and a second conductive pattern (e.g., a touch sensing circuit) disposed to corresponding to the touch sensing area 630 in the internal space of the housing 210. For example, the first conductive pattern may be electrically connected to the grip sensor 211 (e.g., the grip sensor IC) disposed inside the electronic device 101, and the second conductive pattern may be electrically connected to the touch sensor 212 (e.g., the touch sensor IC) disposed inside the electronic device 101. According to an embodiment, the electronic device 101 may detect a grip input for the first conductive pattern corresponding to the grip sensing area 640 and may detect a touch input for the second conductive pattern corresponding to the touch sensing area 630. The grip sensing area 640 and the touch sensing area 630 do not overlap each other.

According to an embodiment, the touch sensor 212 may detect a change in capacitance due to contact of the human body (e.g., a finger) with the touch sensing area 630 provided in the first case 611. The grip sensor 211 may detect a change in capacitance due to contact of the human body (e.g., a finger) with the grip sensing area 640 provided in the first case 611. According to an embodiment, the electronic device 101 may use the second conductive pattern used to detect an input to the touch sensing area 630 as an antenna, or use the first conductive pattern used to detect an input to the grip sensing area 640 as an antenna. According to an embodiment, the antenna may be configured to transmit or receive a wireless signal based on a designated frequency band (e.g., a frequency band ranging from about 600 MHz to 6000 MHZ).

According to various example embodiments, the electronic device may include a housing 610 including a first surface exposed to an external environment and a second surface in physical contact with the human body and not exposed to the external environment based on the electronic 101 being worn on a portion of the human body, a grip sensor (e.g., the grip sensor 211 of FIG. 2) electrically connected to at least one first conductive pattern disposed in at least one first area (e.g., the grip sensing area 640) of the first surface, a touch sensor (e.g., the touch sensor 212 of FIG. 2) located inside the at least one first area and electrically connected to a second conductive pattern disposed in a second area (e.g., the touch sensing area 630) of the first surface, a wearing detection sensor (e.g., the wearing detection sensor 220 of FIG. 2) electrically connected to a third conductive pattern disposed in a third area of the second surface, and at least one processor, comprising processing circuitry (e.g., the processor 201 of FIG. 2), electrically connected to the grip sensor, the touch sensor, and the wearing detection sensor. At least one processor, individually and/or collectively, may be configured to: identify a state in which the electronic device is worn on the portion of the human body using the grip sensor and the wearing detection sensor, and stop a touch sensing function for the touch sensor in response to the state in which the electronic device is worn on the portion of the human body.

According to an example embodiment, at least one processor, individually and/or collectively, may be configured to: measure at least one sensing value according to the state in which the electronic device is worn on the portion of the human body, identify that wearing for the electronic device is completed based on the measured at least one sensing value, and resume the stopped touch sensing function in response to the identified completion.

Figure 7A:
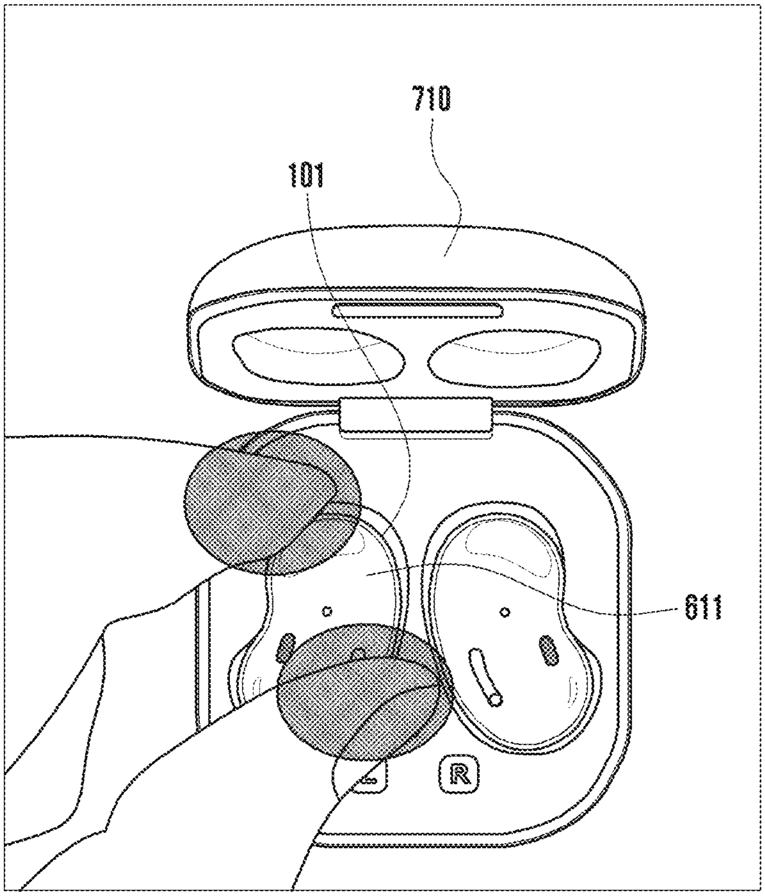
FIG. 7A is a diagram illustrating a first grip operation for a wearable electronic device according to various embodiments.
Figure 7B:
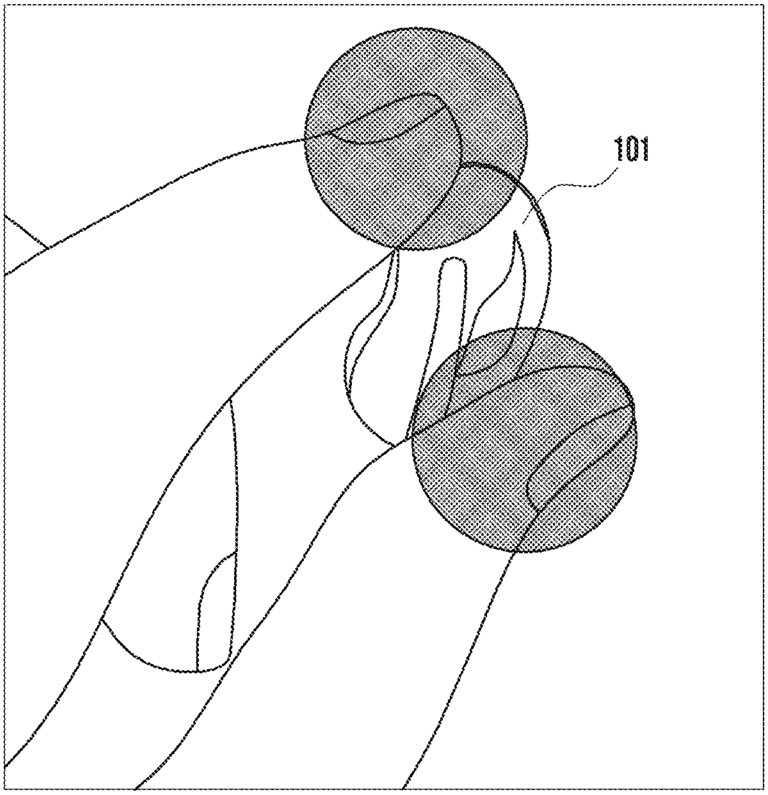
FIG. 7B is a diagram illustrating a second grip operation for a wearable electronic device according to various embodiments.
Figure 7C:
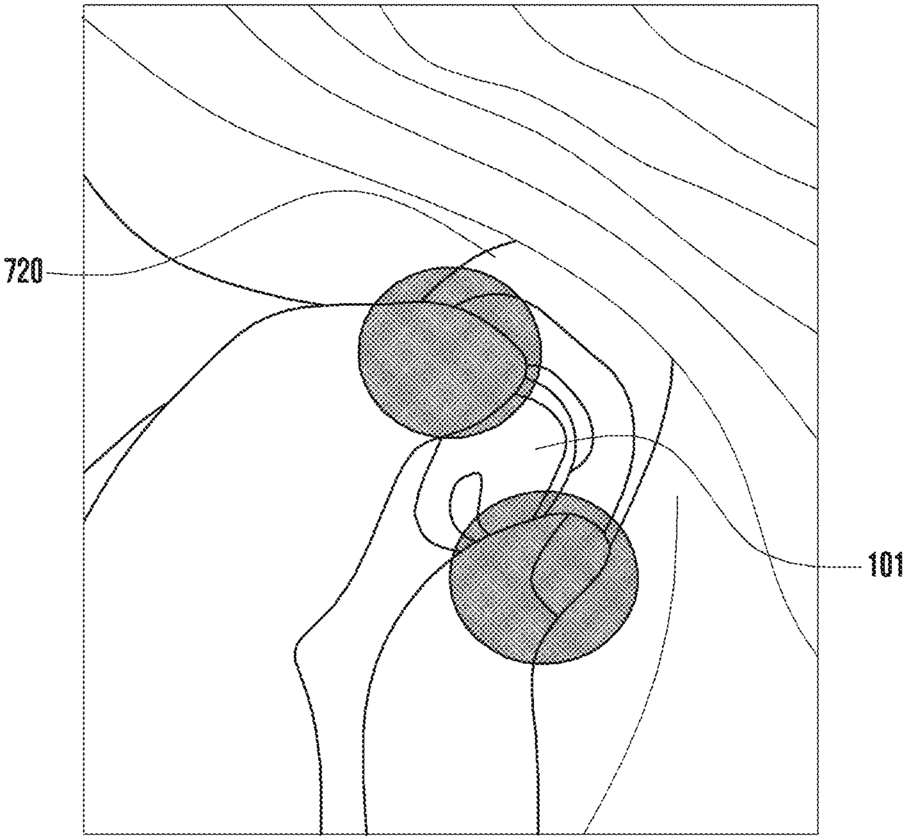
FIG. 7C is a diagram illustrating a third grip operation for a wearable electronic device according to various embodiments.

FIG. 7A is perspective view illustrating a first grip operation for a wearable electronic device according to various embodiments. FIG. 7B is a diagram illustrating an example second grip operation for a wearable electronic device according to various embodiments. FIG. 7C is a diagram illustrating an example third grip operation for a wearable electronic device according to various embodiments.

FIG. 7A illustrates a state in which the electronic device 101 is picked up by a user while being mounted on a cradle 710. For example, the user may detach the electronic device 101 from the cradle 710 using the thumb and index finger. The electronic device 101 may detect that the electronic device 101 is in physical contact with a human body (e.g., a finger) based on a partial area (e.g., a grip sensing area) of the first surface 611.

FIG. 7B illustrates a state in which the electronic device 101 gripped by the user moves to a portion (e.g., an ear) of the human body. For example, the user may grip the electronic device 101 using the thumb and index finger. An area where the thumb and index finger contact may include a grip sensing area (e.g., the grip sensing area 640 in FIG. 6A).

FIG. 7C illustrates a state in which the electronic device 101 gripped by the user is completely worn on the portion (e.g., an ear) of the human body 720. For example, the user may adjust the posture of the electronic device 101 based on the shape of the ear while gripping the electronic device 101 using the thumb and index finger.

According to an embodiment, the electronic device 101 may identify a wearing process for the electronic device 101 based on the grip sensing area 640 corresponding to the grip sensor 211, and stop the touch sensing function for the touch sensing area 640 corresponding to the touch sensor 212 in response to the start of the wearing process. The electronic device 101 may stop the touch sensing function of the touch sensor 212 to prevent and/or reduce malfunction based on the touch sensor 212 from occurring during the wearing process of the electronic device 101.

Figure 8A:
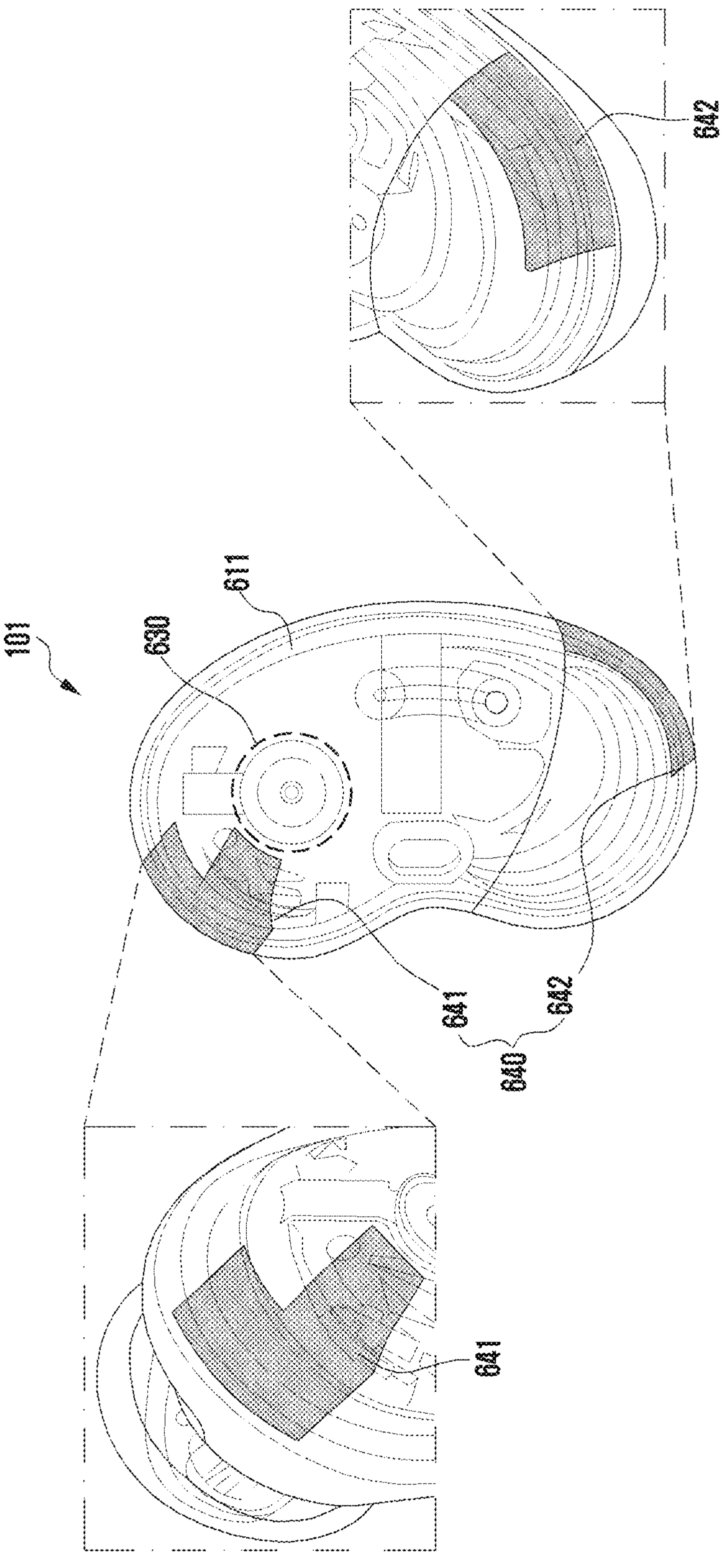
FIG. 8A is a diagram illustrating an example in which at least a partial area is implemented as a grip sensing area to correspond to a first case of a wearable electronic device according to various embodiments.

FIG. 8A is a diagram illustrating an example in which at least a partial area is implemented as a grip sensing area to correspond to a first case of a wearable electronic device according to various embodiments.

The electronic device of FIG. 8A (e.g., the electronic device 101 of FIG. 1) may be at least partially similar to the electronic device 101 of FIG. 2, or may further include various embodiments of the electronic device 101.

Referring to FIG. 8A, when the electronic device 101 is worn on a portion of the human body, the touch sensing area 630 and the grip sensing area 640 may be at least partially formed based on the first case 611 that is exposed to the external environment. For example, the touch sensing area 630 may be determined based on the location of a touch sensor (e.g., a second conductive pattern electrically connected to the touch sensor 212 in FIG. 2), and may be determined based on the location of a grip sensor (e.g., a first conductive pattern electrically connected to the grip sensor 211 of FIG. 2).

The grip sensing area 640 may be formed to correspond to a position where the user's finger touches when the user grips the electronic device 101. For example, the grip sensing area 640 may have an area of approximately 40 to 45 $mm^2$ so that a physical input (e.g., touch input) of the human body (e.g., finger) is detected within a predetermined range. The grip sensing area 640 may be electrically connected to a flexible printed circuit board (FPCB) and a laser direct structuring (LDS) pattern disposed in the internal space of the electronic device 101. The first conductive pattern corresponding to the grip sensing area 640 may be formed based on the internal structure of the electronic device 101. For example, the first conductive pattern may be at least partially formed in the first case 611 by being at least partially injected or structurally combined.

The touch sensing area 630 may be formed to correspond to a location where the user's touch occurs while the electronic device 101 is worn on the user's ear. The touch sensing area 630 may also have an area of a predetermined size (e.g., approximately 40 to 45 mm) to detect a physical input (e.g., touch input) of the human body (e.g., a finger) within a predetermined range. Similar to the grip sensing area 640, the touch sensing area 630 may also be electrically connected to the FPCB and LDS pattern of the electronic device 101. The touch sensing area 630 may be formed at least partially in the first case 611 based on the second conductive pattern.

According to an embodiment, the touch sensing area 630 and the grip sensing area 640 may be formed based on a conductive decoration member disposed on the outer surface of the first case 611.

Figure 8B:
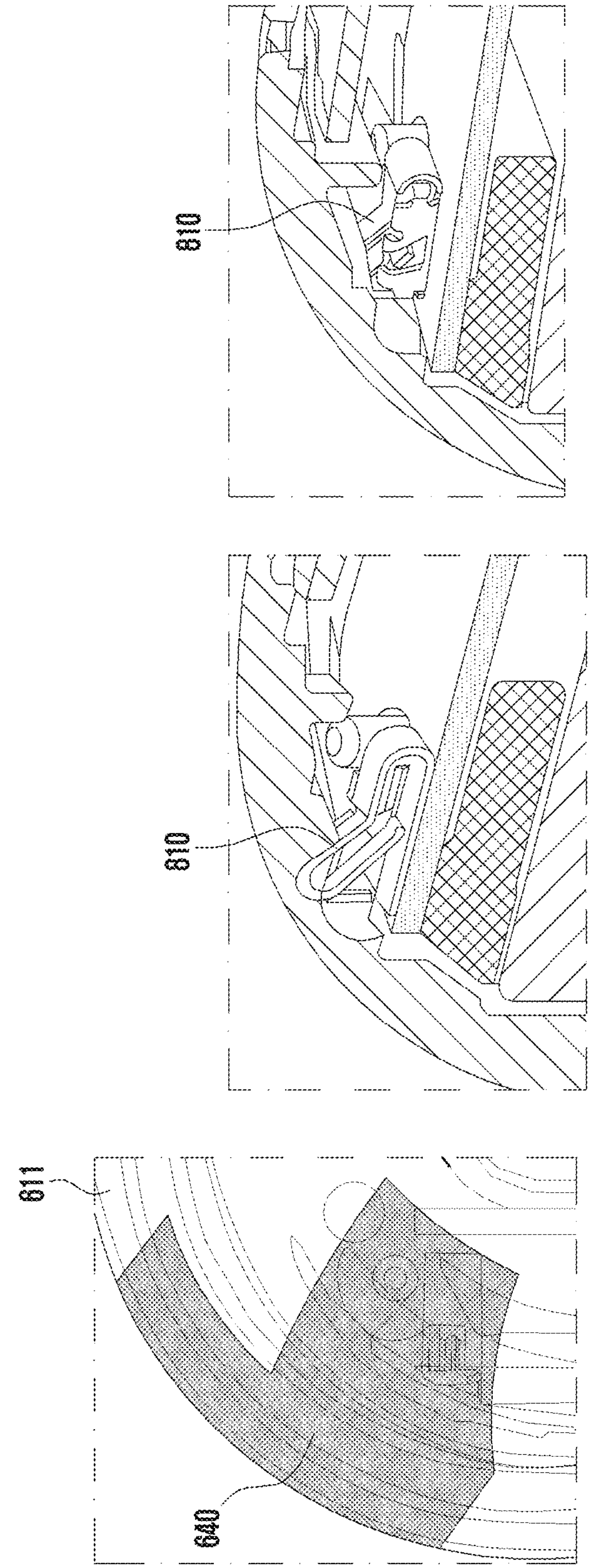
FIG. 8B is a partial perspective view illustrating a grip sensing method for a grip sensing area of a wearable electronic device according to various embodiments.

FIG. 8B is a diagram illustrating a grip sensing method for a grip sensing area of a wearable electronic device according to various embodiments.

The electronic device of FIG. 8B (e.g., the electronic device 101 of FIG. 1) may be at least partially similar to the electronic device 101 of FIG. 2, or may further include various embodiments of the electronic device 101.

Referring to FIG. 8B, the electronic device 101 may have a grip sensing area 640 at least partially formed based on the first case 611. For example, when the electronic device 101 is worn on a portion of the human body, at least partial area of the surface of the first case 611 exposed to the outside may be used as the grip sensing area 640. The electronic device 101 may have a PCB disposed therein, and may electrically connect the PCB and the grip sensing area 640 using at least one clip 810. According to an embodiment, the electrical connection between the grip sensing area 640 and the PCB is not limited to the clip 810, and the processor 201 may determine whether the PCB and the grip sensing area 640 are connected based on a switching operation for the clip 810.

Figure 8C:
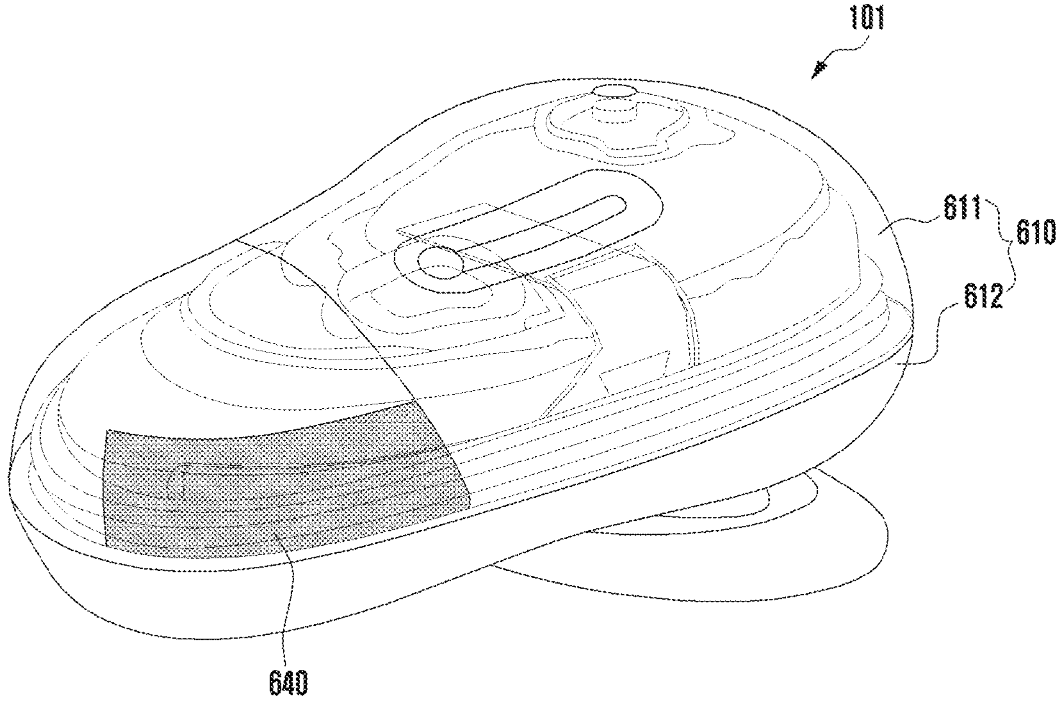
FIG. 8C is a perspective view illustrating the internal structure of a grip sensing area and a touch sensing area of a wearable electronic device according to various embodiments.
Figure 8D:
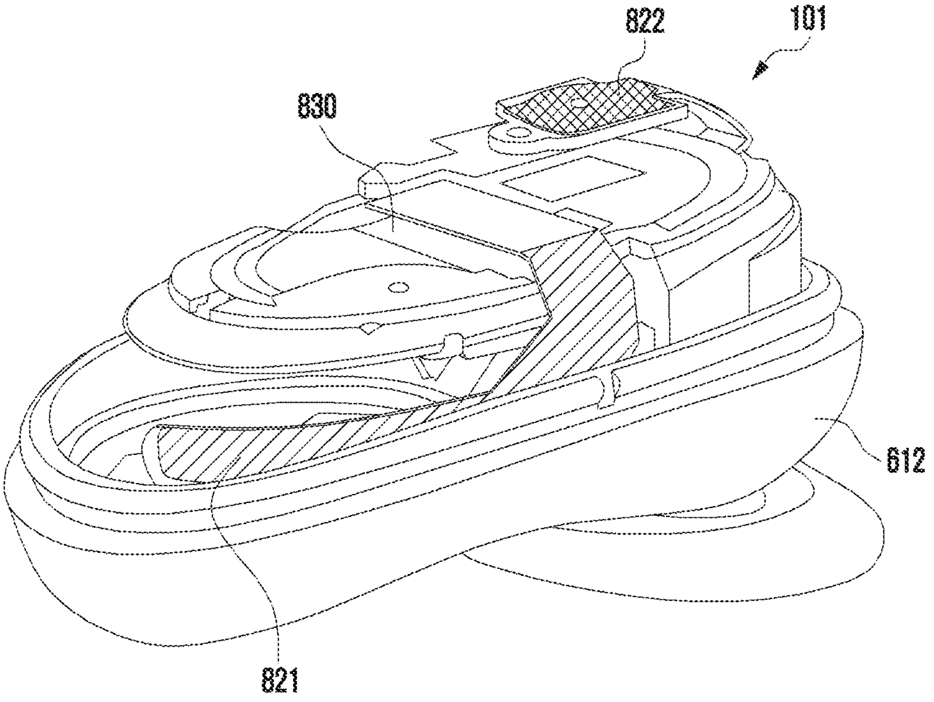
FIG. 8D is a perspective view illustrating the internal structure of a grip sensing area and a touch sensing area of a wearable electronic device according to various embodiments.
Figure 8E:
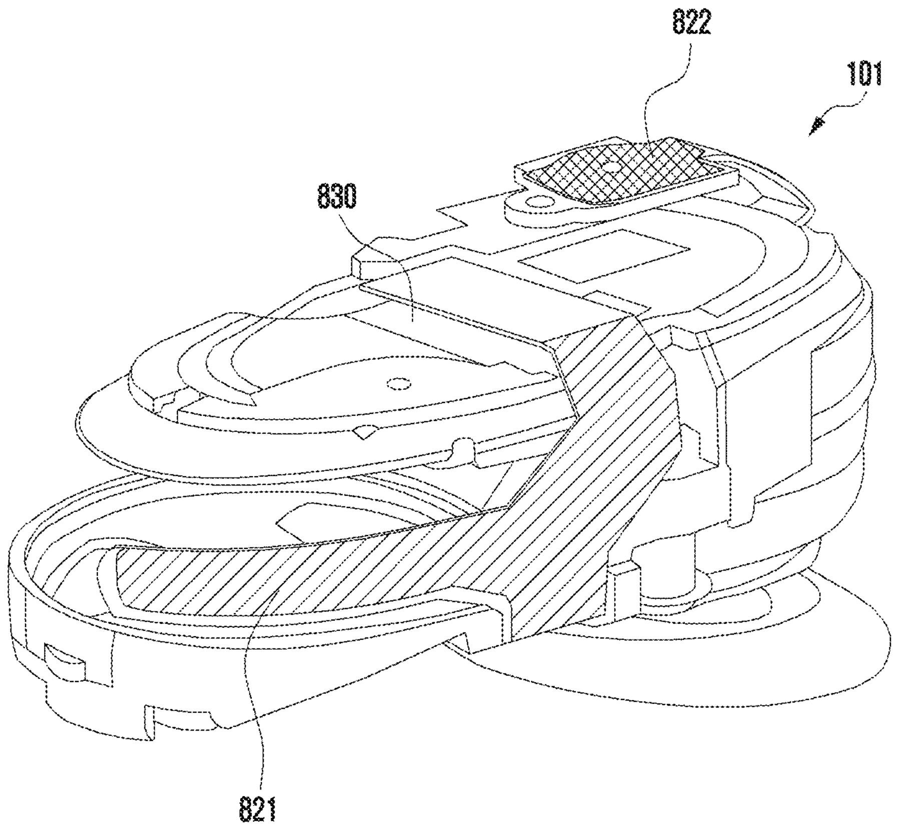
FIG. 8E is a perspective view illustrating the internal structure of a grip sensing area and a touch sensing area of a wearable electronic device according to various embodiments.

FIG. 8C is a perspective view illustrating a first example of the internal structure of a grip sensing area and a touch sensing area of a wearable electronic device according to various embodiments. FIG. 8D is a perspective view illustrating a second example of the the internal structure of a grip sensing area and a touch sensing area of a wearable electronic device according to various embodiments. FIG. 8E is a perspective view illustrating a third example of the the internal structure of a grip sensing area and a touch sensing area of a wearable electronic device according to various embodiments.

Referring to FIGS. 8C, 8D and 8E, the internal structures of the grip sensing area 640 and the touch sensing area of the electronic device 101 are shown. The electronic device 101 may be externally implemented as the housing 610 including the first case 611 and the second case 612 coupled to the first case 611. For example, the housing 610 may protect components disposed inside the electronic device 101 from the external environment, and the grip sensing area 640 and the touch sensing area may be at least partially formed on the outer surface of the housing 610.

According to an embodiment, the grip sensing area 640 may be formed based on an area (e.g., an area where a grip input according to a grip motion occurs) that is frequently physically contacted when the user grips the electronic device 101. The grip sensing area 640 may be determined based on a first conductive pattern 821 disposed in the internal space of the electronic device 101. For example, the first conductive pattern 821 may be at least partially included in a flexible printed circuit board (FPCB) 830 and/or a laser direct structuring (LDS) pattern, and may be electrically connected to a PCB disposed therein. According to an embodiment, the processor (e.g., the processor 201 of FIG. 2) of the electronic device 101 may determine whether the user has gripped the electronic device 101 based on the first conductive pattern electrically connected to the PCB. According to an embodiment, at least partial area of the first surface (e.g., the first surface 621 in FIG. 6A) corresponding to the first case 611 of the housing 610 may be formed as a grip sensing area 640 and may be implemented as a conductive member. The grip sensing area 640 may be replaced with a conductive decorative member disposed on the outer surface of the electronic device 101.

According to an embodiment, when the electronic device 101 is worn on a portion of the human body, the first case 611 may include an area (e.g., the first surface 621 in FIG. 6A) exposed to the external environment, and the second case 612 may include an area (e.g., the second surface 622 in FIG. 6B) that is in physical contact with the portion of the human body or is not exposed to the external environment. The grip sensing area 640 may be formed at least partially in the first case 611 based on the first conductive pattern 821, and may be divided into a plurality of areas. The touch sensing area (e.g., the touch sensing area 630 in FIG. 6) may be formed at least partially in the first case 611 based on the second conductive pattern 822. According to an embodiment, the grip sensing area 640 and the touch sensing area 630 may be formed to be physically distinct from each other. The grip sensing area 640 and the touch sensing area 630 may be electrically connected to the PCB of the electronic device 101, and under the control of the processor 201, the grip sensing function and the touch sensing function may be performed.

According to an embodiment, the processor 201 of the electronic device 101 may identify a process (e.g., wearing process) of wearing the electronic device 101 on a portion of the human body (e.g., the sensor module 210 of FIG. 2) based on a sensor module (e.g., the sensor module 210 of FIG. 2), and in response to the identification, at least partially stop the performance of the touch sensing function. The processor 201 may stop the performance of the touch sensing function while the wearing process for the electronic device 101 is in progress and prevent and/or reduce malfunctions that may occur due to the touch sensing function.

Figure 9:
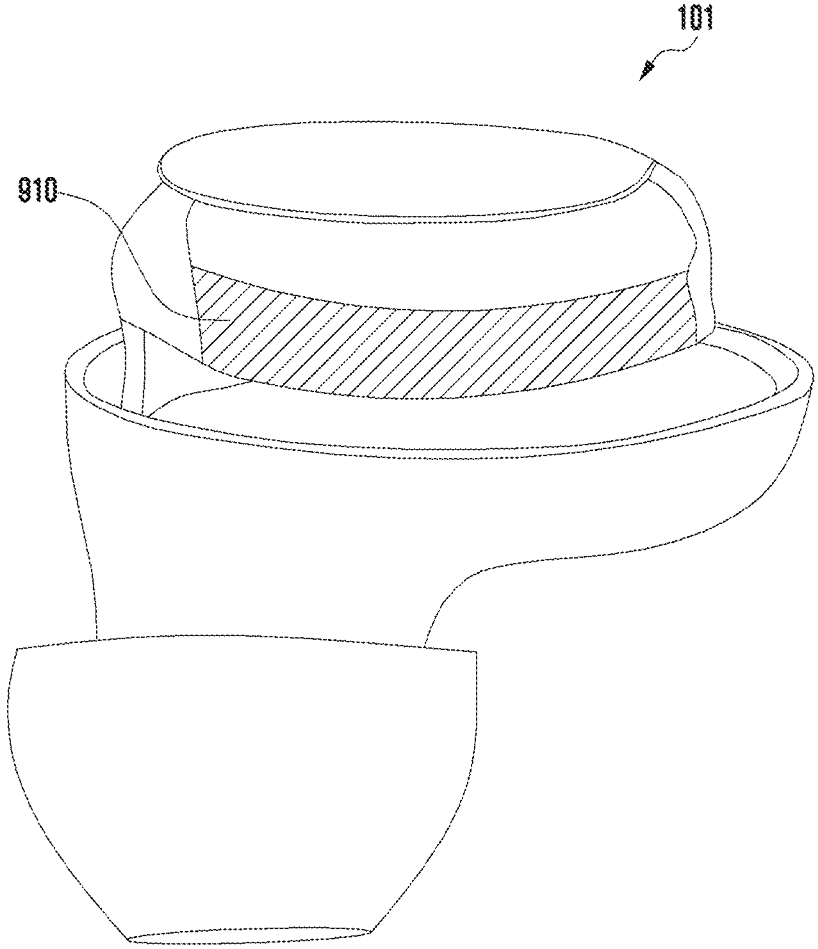
FIG. 9 is a perspective view illustrating a conductive pattern formed to correspond to a grip sensing area of a wearable electronic device according to various embodiments.

FIG. 9 is a diagram illustrating an example conductive pattern formed to correspond to a grip sensing area of a wearable electronic device according to various embodiments.

The electronic device of FIG. 9 (e.g., the electronic device 101 of FIG. 1) may be at least partially similar to the electronic device 101 of FIG. 2, or may further include various embodiments of the electronic device 101. The electronic device 101 may include a wearable electronic device worn on a portion of the user's body. The electronic device 101 is not limited to a specific form factor and may be implemented in various forms (e.g., open-type earphones, canal-type earphones).

Referring to FIG. 9, the electronic device 101 may have a grip sensing pattern 910 (e.g., a conductive pattern, an LDS pattern) disposed to correspond to a grip sensing area (e.g., the grip sensing area 640 of FIG. 6). For example, the grip sensing pattern 910 may be formed in a form that is deposited on a PCB and a bracket structure, and may be electrically connected to a grip circuit included in the PCB. The grip sensing pattern 910 may be substantially implemented as a single conductive member, or may be implemented as a plurality of individually formed conductive members. The grip sensing pattern 910 may be disposed adjacent to the grip sensing area 640 formed on the outer surface of the electronic device 101. According to an embodiment, the grip sensing pattern 910 may be implemented based on a conductive decoration member disposed on the outer surface of the electronic device 101.

According to various embodiments, the grip sensing pattern 910 may be implemented in a form that at least partially surrounds a battery disposed inside the housing (e.g., the housing 610 in FIG. 6) and/or an interior surface (e.g., inner surface) of the housing 610. For example, the grip sensing pattern 910 (e.g., a conductive pattern, an LDS pattern) may be disposed on at least some areas corresponding to the inner surface of the housing 610. As another example, the grip sensing pattern 910 may be implemented in a form in which a FPCB at least partially surrounds the inner surface of the battery and/or housing 610. The grip sensing pattern 910 may be electrically connected to a PCB.

A wearing detection method according to various example embodiments may include: identifying a wearing process for an electronic device (e.g., the electronic device 101 of FIG. 2) using a grip sensor (e.g., the grip sensor 211 of FIG. 2) and a wearing detection sensor (e.g., the wearing detection sensor 220 of FIG. 2), stopping a touch sensing function for a touch sensor (e.g., the touch sensor 212 of FIG. 2) in response to the identified wearing process, measuring at least one sensing value related to the wearing process using the grip sensor and the wearing detection sensor, identifying completion of the wearing process based on the measured at least one sensing value, and resuming the stopped touch sensing function in response to the identified completion of the wearing process.

The wearing detection method according to an example embodiment may further include: detecting a grip input to a first area corresponding to the grip sensor and detecting a touch input to a second area corresponding to the touch sensor, wherein the first area and the second area do not overlap each other.

The wearing detection method according to an example embodiment may further include: identifying the grip input through at least one conductive pattern disposed to correspond to the first area, and identifying that the wearing process for the electronic device has started in response to the identified grip input.

According to an example embodiment, the wearing detection sensor 220 may further include: at least one of an acceleration sensor (e.g., the acceleration sensor 221 of FIG. 2) configured to identify motion information and movement information about the electronic device, a gyro sensor (e.g., the gyro sensor 222 of FIG. 2) configured to identify angle information of the electronic device, and a proximity sensor (e.g., the proximity sensor 223 of FIG. 2) configured to identify whether the electronic device has been worn on the portion of the human body.

The stopping of the touch sensing function for the touch sensor according to an example embodiment may include: stopping the touch sensing function for the touch sensor during the wearing process corresponding to a process from the start of the wearing process to completion of the wearing process.

The stopping of the touch sensing function for the touch sensor according to an example embodiment may include: at least partially stopping the touch sensing function during the wearing process, ignoring an input occurring through the touch sensor, or switching the touch sensor to a deactivated state.

The wearing detection method according to an example embodiment may further include: identifying a removal process for the electronic device using the grip sensor and the wearing detection sensor, measuring at least one sensing value related to the removal process using the grip sensor and the wearing detection sensor, identifying a state in which the removal process is in progress based on the measured at least one sensing value, and stopping the touch sensing function for the touch sensor based on the removal process being in progress.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), the element may be coupled/connected with/to the other element directly (e.g., wiredly), wirelessly, or via a third element.

As used in various embodiments of the disclosure, the term "module" may include a unit implemented in hardware, software, or firmware, or any combination thereof, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., a program) including one or more instructions that are stored in a storage medium (e.g., an internal memory or external memory) that is readable by a machine (e.g., the electronic device 101). For example, a processor (e.g., the processor 201) of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The various example embodiments of the disclosure described and shown in the disclosure and the drawings are merely examples that have been presented to easily explain the technical contents of the disclosure and aid in understanding of the disclosure, and are not intended to limit the scope of the disclosure. Therefore, the scope of the disclosure should be construed to include, in addition to the embodiments set forth herein, all changes and modifications derived on the basis of the technical idea of the disclosure, including the appended claims and their equivalents. It will also be understood that any of the embodiment(s) described herein may be used in conjunction with any other embodiment(s) described herein.

What is claimed is:

1. An electronic device comprising:
a grip sensor;
a touch sensor;
a wearing detection sensor; and
at least one processor, comprising processing circuitry, electrically connected to the grip sensor, the touch sensor, and the wearing detection sensor,
wherein at least one processor, individually or collectively, is configured to:
identify a start of a wearing process for the electronic device using the grip sensor and the wearing detection sensor;
stop a touch sensing function for the touch sensor for a predetermined period of time in response to identifying the start of the wearing process;
while the touch sensing function for the touch sensor is stopped, measure at least one sensing value related to the wearing process using the grip sensor and the wearing detection sensor;
during the predetermined period of time, identify completion of the wearing process based on the measured at least one sensing value; and
resume the touch sensing function for the touch sensor in response to identifying the completion of the wearing process during the predetermined period of time.

2. The electronic device of claim 1, further comprising a housing configured to be worn on a portion of a human body,
wherein the housing comprises a first surface and a second surface, and, based on the electronic device being worn on the portion of the human body, the first surface is exposed to an external environment and the second surface physically contacts the human body and is not exposed to the external environment.

3. The electronic device of claim 2, wherein the at least one processor, individually or collectively, is configured to:
detect a grip input to a first area determined based on the first surface of the housing using the grip sensor; and
detect a touch input to a second area determined based on the first surface of the housing using the touch sensor, and
wherein the first area and the second area do not overlap each other.

4. The electronic device of claim 3, further comprising:
at least one conductive pattern disposed in an internal space of the housing based on the first area; and
a grip detection circuit electrically connected to the at least one conductive pattern,
wherein the at least one processor, individually or collectively, is configured to:
identify a grip input to the first area based on the grip detection circuit; and
identify that the wearing process for the electronic device has started, in response to the identification.

5. The electronic device of claim 4, wherein the at least one processor, individually or collectively, is configured to:
identify a grip sensing value for the first area based on the at least one conductive pattern; and
identify that the grip input has occurred, based on the identified grip sensing value.

6. The electronic device of claim 2, wherein the wearing detection sensor comprises an acceleration sensor disposed in an internal space of the housing, a gyro sensor, and a proximity sensor disposed to correspond to a proximity sensing area determined based on the second surface of the housing, and
wherein the at least one processor, individually or collectively, is configured to:
identify motion information and movement information about the electronic device using the acceleration sensor;
identify angle information for the electronic device using the gyro sensor; and
identify whether the electronic device is worn on the portion of the human body, using the proximity sensor.

7. The electronic device of claim 6, wherein the at least one processor, individually or collectively, is configured to:
measure a sensing value for at least one of the acceleration sensor, the gyro sensor, and the proximity sensor included in the wearing detection sensor according to a specified period, and identify a state of the electronic device.

8. The electronic device of claim 6, wherein the at least one processor, individually or collectively, is configured to:
identify a state in which the electronic device is worn on the portion of the human body, based on a proximity sensing value for the proximity sensor; and
identify that the wearing process for the electronic device has been completed, based on an acceleration sensing value for the acceleration sensor and a posture sensing value for the gyro sensor being included in a specified range.

9. The electronic device of claim 1, wherein a process from the start of the wearing process to the completion of the wearing process comprises the wearing process, and
wherein the at least one processor, individually or collectively, is configured to:
stop the touch sensing function for the touch sensor during the wearing process.

10. The electronic device of claim 9, wherein at least one processor, individually or collectively, is configured to:
stop at least a portion of the touch sensing function for the touch sensor during the wearing process, ignore an input occurring through the touch sensor, or switch the touch sensor into a deactivated state.

11. The electronic device of claim 1, wherein the at least one processor, individually or collectively, is configured to:
identify a start of a removal process for the electronic device worn on a portion of a human body based on the grip sensor and the wearing detection sensor;
stop the touch sensing function for the touch sensor in response to identifying the start of the removal process;
measure at least one sensing value related to the removal process using the grip sensor and the wearing detection sensor;

identify a state in which the removal process is in progress based on the measured at least one sensing value; and maintain the stopped state of the touch sensing function for the touch sensor during the removal process.

12. A wearing detection method comprising:

identifying a start of a wearing process for an electronic device using a grip sensor and a wearing detection sensor;

stopping a touch sensing function for a touch sensor for a predetermined period of time in response to the identifying the start of the wearing process;

while the touch sensing function for the touch sensor is stopped, measuring at least one sensing value related to the wearing process using the grip sensor and the wearing detection sensor;

identifying completion of the wearing process based on the measured at least one sensing value; and resuming the touch sensing function for the touch sensor in response to identifying the completion of the wearing process during the predetermined period of time.

13. The wearing detection method of claim 12, further comprising:

detecting a grip input to a first area corresponding to the grip sensor; and detecting a touch input to a second area corresponding to the touch sensor, wherein the first area and the second area do not overlap each other.

14. The wearing detection method of claim 13, further comprising:

identifying the grip input through at least one conductive pattern disposed to correspond to the first area; and identifying that the wearing process for the electronic device has started, in response to the identified grip input.

15. The wearing detection method of claim 12, wherein the wearing detection sensor further comprises: an acceleration sensor configured to identify motion information and movement information about the electronic device, a gyro sensor configured to identify angle information for the electronic device, and a proximity sensor configured to identify whether the electronic device has been worn on the portion of the human body.

16. The wearing detection method of claim 12, wherein the stopping of the touch sensing function for the touch sensor comprises stopping the touch sensing function for the touch sensor during the wearing process corresponding to a process from the start of the wearing process to completion of the wearing process.

17. The wearing detection method of claim 12, wherein the stopping of the touch sensing function for the touch sensor comprises: at least partially stopping the touch sensing function during the wearing process, ignoring an input occurring through the touch sensor, or switching the touch sensor into a deactivated state.

18. The wearing detection method of claim 12, further comprising:

identifying a start of a removal process for the electronic device worn on a portion of a human body based on the grip sensor and the wearing detection sensor;

stopping the touch sensing function for the touch sensor in response to identifying the start of the removal process;

measuring at least one sensing value related to the removal process using the grip sensor and the wearing detection sensor;

identifying a state in which the removal process is in progress, based on the measured at least one sensing value; and maintaining the stopped state of the touch sensing function for the touch sensor during the removal process.

19. One or more non-transitory computer-readable storage media storing one or more computer programs including computer-executable instructions that, when executed by one or more processors of an electronic device, cause the electronic device to perform operations, the operations comprising:

identifying a start of a wearing process for an electronic device using a grip sensor and a wearing detection sensor;

stopping a touch sensing function for a touch sensor for a predetermined period of time in response to identifying the start of the wearing process;

while the touch sensing function for the touch sensor is stopped, measuring at least one sensing value related to the wearing process using the grip sensor and the wearing detection sensor;

identifying completion of the wearing process based on the measured at least one sensing value; and resuming the touch sensing function for the touch sensor in response to identifying the completion of the wearing process during the predetermined period of time.

20. The one or more non-transitory computer-readable storage media of claim 19, wherein the operations further comprising:

detecting a grip input to a first area corresponding to the grip sensor; and detecting a touch input to a second area corresponding to the touch sensor, wherein the first area and the second area do not overlap each other.

* * * * *